United States Patent
Okabe et al.

(10) Patent No.: US 9,636,952 B2
(45) Date of Patent: May 2, 2017

(54) HEAVY DUTY PNEUMATIC TIRE

(71) Applicant: Sumitomo Rubber Industries Ltd., Kobe-shi, Hyogo (JP)

(72) Inventors: Taro Okabe, Kobe (JP); Makoto Igarashi, Kobe (JP); Minoru Nishi, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 239 days.

(21) Appl. No.: 14/572,857

(22) Filed: Dec. 17, 2014

(65) Prior Publication Data
US 2015/0191052 A1 Jul. 9, 2015

(30) Foreign Application Priority Data

Jan. 8, 2014 (JP) .................................. 2014-001841
Jan. 8, 2014 (JP) .................................. 2014-001842
Jan. 17, 2014 (JP) .................................. 2014-007180

(51) Int. Cl.
*B60C 11/12* (2006.01)
*B60C 11/03* (2006.01)
*B60C 11/13* (2006.01)

(52) U.S. Cl.
CPC ........ *B60C 11/125* (2013.04); *B60C 11/0309* (2013.04); *B60C 11/1369* (2013.04);
(Continued)

(58) Field of Classification Search
CPC . B60C 11/0306; B60C 11/0309; B60C 11/12; B60C 11/125; B60C 11/1204;
(Continued)

(56) References Cited

U.S. PATENT DOCUMENTS

2001/0003998 A1  6/2001  Tuda et al.
2006/0254684 A1  11/2006  Tamura
(Continued)

FOREIGN PATENT DOCUMENTS

EM    2 610 080 A1    7/2013
EM    2 786 880 A2    10/2014
(Continued)

OTHER PUBLICATIONS

Extended European Search Report issued May 20, 2015, in European Patent Application No. 15150058.4.

Primary Examiner — Eric Hug
(74) Attorney, Agent, or Firm — Birch, Stewart, Kolasch & Birch, LLP

(57) ABSTRACT

A heavy duty pneumatic tire includes a tread portion provided with circumferentially extending zigzag shaped main grooves, a plurality of land portions separated by the main grooves, and a plurality of lateral grooves to form a plurality of block elements on each land portion. Each land portion comprises a number of pitches in a range of from 40 to 50, wherein each pitch consists of one block element and one lateral groove adjacent to the concerned block element. Each block element has a length in a range of from 85% to 95% of a length of the pitch. The main grooves include a crown main groove, a shoulder main groove, and a middle main groove. The middle main groove has a zigzag amplitude larger than those of the crown main groove and the shoulder main groove.

16 Claims, 17 Drawing Sheets

(52) U.S. Cl.
CPC ............... *B60C 2011/0346* (2013.04); *B60C 2011/0355* (2013.04)

(58) Field of Classification Search
CPC ............ B60C 11/1209; B60C 11/1218; B60C 11/1259; B60C 11/1263; B60C 11/1353; B60C 11/1369; B60C 2011/0358; B60C 2011/0362; B60C 2011/0367; B60C 2011/0369; B60C 2011/0374; B60C 2011/0379; B60C 2200/06; B60C 11/033; B60C 2011/0348; B60C 2011/0346; B60C 2011/0353; B60C 11/047; B60C 2011/0372; B60C 2011/0363
USPC ........................................ 152/209.18, 209.25
See application file for complete search history.

(56) References Cited

U.S. PATENT DOCUMENTS

| | | | |
|---|---|---|---|
| 2013/0160909 A1* | 6/2013 | Atake | B60C 11/0311 152/209.25 |
| 2014/0216620 A1* | 8/2014 | Tanaka | B60C 11/125 152/209.25 |
| 2014/0224397 A1* | 8/2014 | Okabe | B60C 11/033 152/209.23 |
| 2014/0224398 A1* | 8/2014 | Okabe | B60C 11/1263 152/209.23 |
| 2014/0299244 A1* | 10/2014 | Okabe | B60C 11/0309 152/209.25 |

FOREIGN PATENT DOCUMENTS

| | | |
|---|---|---|
| JP | 2001-171312 A | 6/2001 |
| JP | 2006-315579 A | 11/2006 |

\* cited by examiner

B-B Section

D-D Section

HEAVY DUTY PNEUMATIC TIRE

BACKGROUND OF THE INVENTION

Field of the Invention

The present invention relates to a heavy duty pneumatic tire that may exhibit an excellent chipping resistance and low rolling resistance.

Description of the Related Art

Japanese Unexamined Patent Application Publication No. 2006-315579 discloses a heavy duty pneumatic tire including a tread portion provided with a plurality of tread blocks that are separated by circumferentially extending main grooves and a plurality of lateral grooves. Typically, the heavy duty pneumatic tire having a lot of lateral grooves has low circumferential pattern rigidity. Unfortunately, such a heavy duty pneumatic tire tends to have high rolling resistance due to a large energy loss generated by deformation of the tread blocks when coming into contact with the road.

In order to improve the rolling resistance of the tire, a tire having a tread portion with less lateral grooves to enhance the circumferential rigidity has been proposed. Unfortunately, such a heavy duty pneumatic tire tends to have low chipping resistance where a small piece of tread rubber is easily chipped from a tread block subjected to a large ground contact pressure.

SUMMARY OF THE INVENTION

The present invention has been worked out in the light of the circumstances described above, and has a main object of providing a heavy duty pneumatic tire that may exhibit an excellent chipping resistance and low rolling resistance.

According to one aspect of the present invention, a heavy duty pneumatic tire includes a tread portion provided with a plurality of circumferentially and continuously extending zigzag shaped main grooves, a plurality of land portions separated by the main grooves, and a plurality of lateral grooves to form a plurality of block elements on each land portions. Each land portion includes a number of pitches in a range of from 40 to 50, wherein each pitch consists of one block element and one lateral groove adjacent to the concerned block element. Each block element has a circumferential length in a range of from 85% to 95% of a circumferential length of the pitch. The main grooves includes at least one crown main groove arranged nearby a tire equator, at least one shoulder main groove arranged nearby a tread edge, and at least one middle main groove arranged between the crown main groove and the shoulder main groove, wherein the middle main groove has a zigzag amplitude larger than those of the crown main groove and the shoulder main groove.

In another aspect of the present invention, the middle main groove includes an axially innermost protruding portion and an axially outermost protruding portion. The lateral grooves include a plurality of axially inner middle lateral grooves each extending from the axially innermost protruding portion of the middle main groove toward axially inward, and a plurality of axially outer middle lateral grooves each extending from the axially outermost protruding portion of the middle main groove toward axially outward. The tread portion is further provided with a plurality of first groove bottom sipes and a plurality of second groove bottom sipes. Each first groove bottom sipe extends from a bottom of the middle main groove to a bottom of the axially inner middle lateral groove. Each second groove bottom sipe extends from the bottom of the middle main groove to a bottom of the axially outer middle lateral groove, wherein the first groove bottom sipe and the second groove bottom sipe are alternately arranged in a circumferential direction of the tire.

In another aspect of the present invention, the first groove bottom sipe extends on a position where the middle main groove and the axially inner middle lateral groove are connected at an acute angle, and the second groove bottom sipe extends on a position where the middle main groove and the axially outer middle lateral groove are connected at an obtuse angle.

In another aspect of the present invention, the tread portion is provided with a pair of the crown main grooves each comprising an axially innermost protruding portion and an axially outermost protruding portion. The lateral grooves include a plurality of crown lateral grooves each connecting between the axially innermost protruding portions of the crown main grooves. Each crown lateral groove inclines in an opposite direction to the axially inner middle lateral groove.

In another aspect of the present invention, each lateral groove of one of the land portions is arranged to be shifted by a substantially half length of the pitch to each lateral groove of the other one of the land portion adjacent to the concerned land portion.

In another aspect of the present invention, middle main groove and each lateral groove have groove depths smaller than those of the crown main groove and the shoulder main groove.

In another aspect of the present invention, the land portions include an axially inner middle land portion arranged between the crown main groove and the middle main groove, and an axially outer middle land portion arranged between the middle main groove and the shoulder main groove. The axially inner middle land portion is provided with a plurality of axially inner lateral grooves to form a plurality of axially inner block elements. The axially outer middle land portion is provided with a plurality of axially outer lateral grooves to form a plurality of axially outer block elements. The tread portion is further provided with a first connecting portion and a second connecting portion. When the tread portion is worn as a first state, the first connecting portion comes into contact with the road to connect the axially inner block element with the axially outer block element so that a plurality of connected blocks are formed, and when the tread portion is worn as a second state that comes from later than the first state, the second connecting portion comes into contact with the road to connect the connected blocks so that a rib is formed.

In another aspect of the present invention, the middle main grooves include a first inclined element, and a second inclined element having a circumferential length smaller than that of the first inclined element. The first connecting portion is provided in the first inclined element.

In another aspect of the present invention, the first connecting portion is provided with a sipe extending along the first inclined element.

In another aspect of the present invention, the second connecting portion has a depth larger than that of the first connecting portion.

In another aspect of the present invention, the first connecting portion has a depth in a range of from 15% to 40% of a maximum groove depth of the main grooves.

In another aspect of the present invention, the middle main groove includes a plurality of axially innermost protruding portions and a plurality of axially outermost protruding portions. Each axially inner middle lateral groove extends from each axially innermost protruding portion of the middle main groove toward axially inward. Each axially outer middle lateral groove extends from each axially outermost protruding portion of the middle main groove toward axially outward.

In another aspect of the present invention, the tread portion is provided with a pair of the crown main grooves. The land portions include a crown land portion arranged between the crown main grooves, a middle land portion arranged between the crown main groove and the shoulder main groove, and a shoulder land portion arranged between the shoulder main groove and the tread edge. In a standard loaded condition where the tire is mounted on a standard rim with a standard pressure and is loaded with a standard load, a contact pressure P1 of the crown land portion is in a range of from 102% to 113% of a contact pressure P2 of the middle land portion, and the contact pressure P2 of the middle portion is in a range of from 135% to 145% of a contact pressure P3 of the shoulder land portion.

In another aspect of the present invention, the tire includes a toroidal carcass, and a belt layer disposed radially outward the carcass in the tread portion. In a standard unloaded condition where the tire is mounted on the standard rim with the standard pressure and no tire load is loaded, a thickness from an outer surface of the belt layer to a tire inner surface at an axial position of the shoulder main groove is in a range of from 8 to 16 mm.

In another aspect of the present invention, the tread portion has a land ratio in a range of from 70% to 85%.

In another aspect of the present invention, the lateral grooves include a plurality of crown lateral grooves extending on the crown land portion, a plurality of middle lateral grooves extending on the middle land portion, and a plurality of shoulder lateral grooves extending on the shoulder land portion. A land ratio of the crown land portion is not less than a land ration of the shoulder land portion, and a land ratio of the middle portion is less than a rand ratio of the shoulder land portion.

In another aspect of the present invention, each of the crown land portion and the middle land portion has an axially maximum width in a range of from 5% to 15% of a tread width.

DETAILED DESCRIPTION

Figure 1:
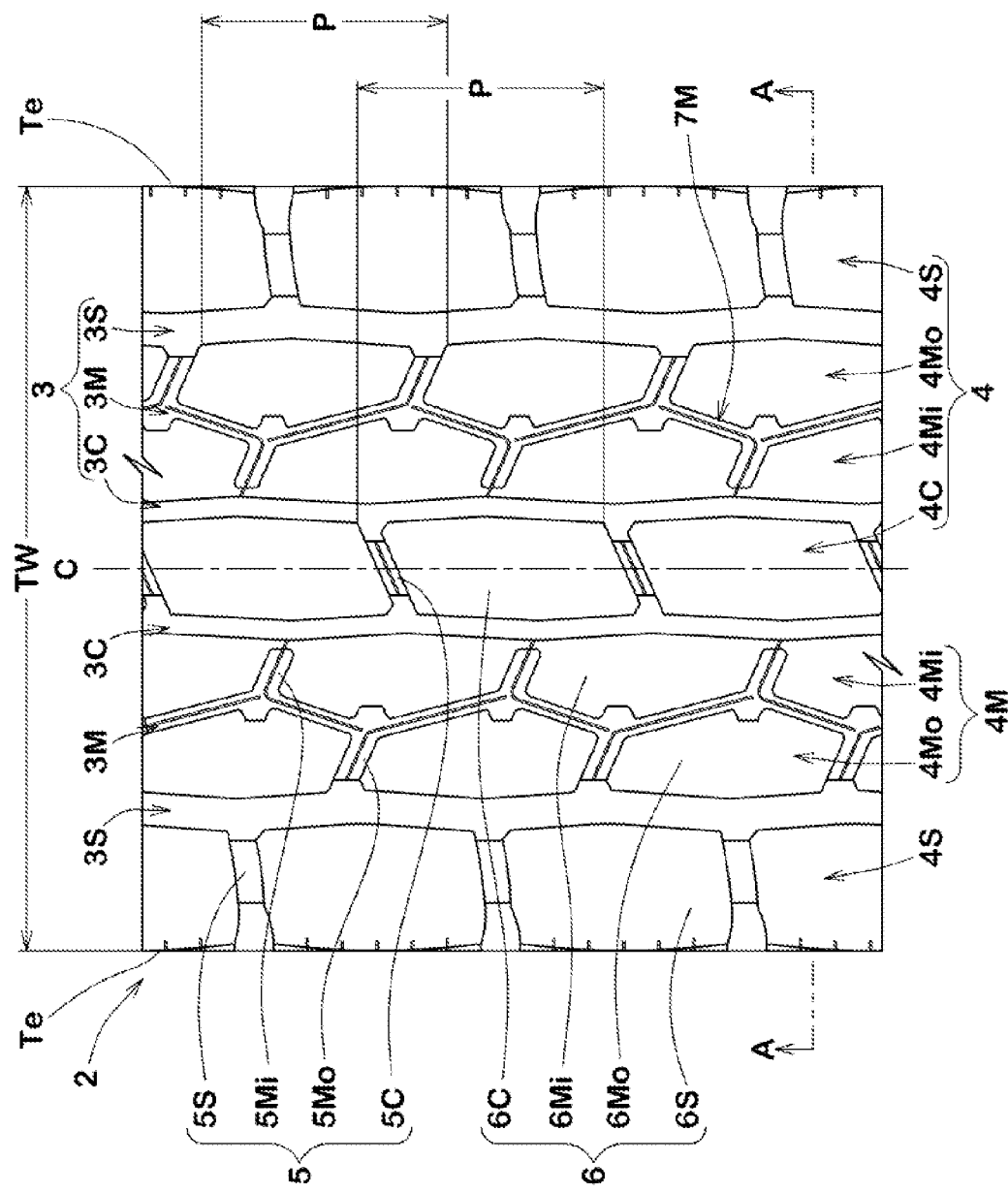
FIG. 1 is a development view of a tread portion of a heavy duty pneumatic tire in accordance with a first embodiment of the present invention.

An embodiment of the present invention will be explained below with reference to the accompanying drawings. It should be noted that the like elements are denoted by the same reference numerals throughout the disclosure.

First Embodiment

FIG. 1 illustrates a development view of a tread portion 2 of a heavy duty pneumatic tire for trucks or busses in accordance with the first embodiment of the present invention.

Referring to FIG. 1, the tread portion 2 is provided with a plurality of circumferentially and continuously extending zigzag shaped main grooves 3. In this embodiment, the main grooves 3 include a pair of crown main grooves 3C, a pair of middle main grooves 3M, and a pair of shoulder main grooves 3S.

Figure 3:
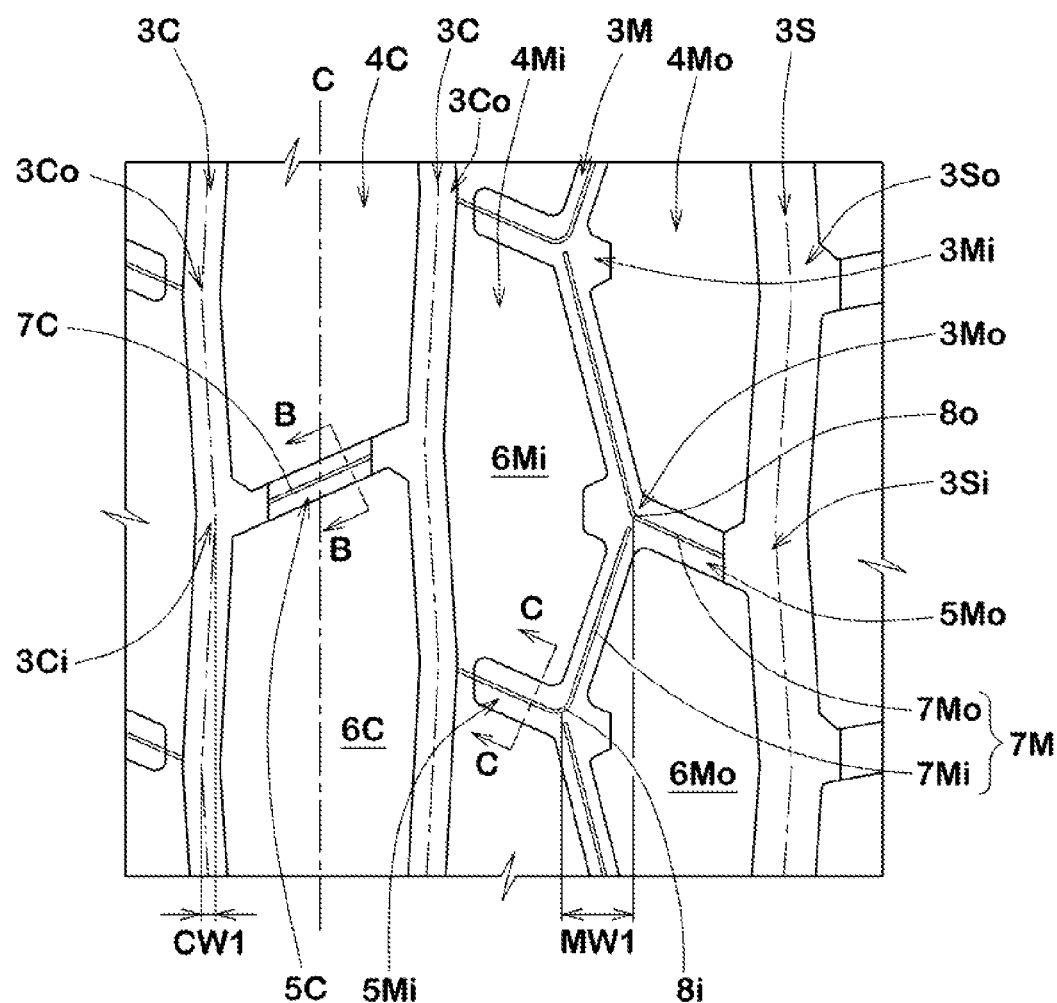
FIG. 3 is a partial enlarged view showing around an inner middle land portion of FIG. 1.

Each crown main groove 3C is arranged nearby a tire equator C on each side of the tire equator C. As shown in FIG. 3, each crown main groove 3C extends in a zigzag manner so as to have an axially innermost protruding portion 3Ci and an axially outermost protruding portion 3Co.

Figure 4:
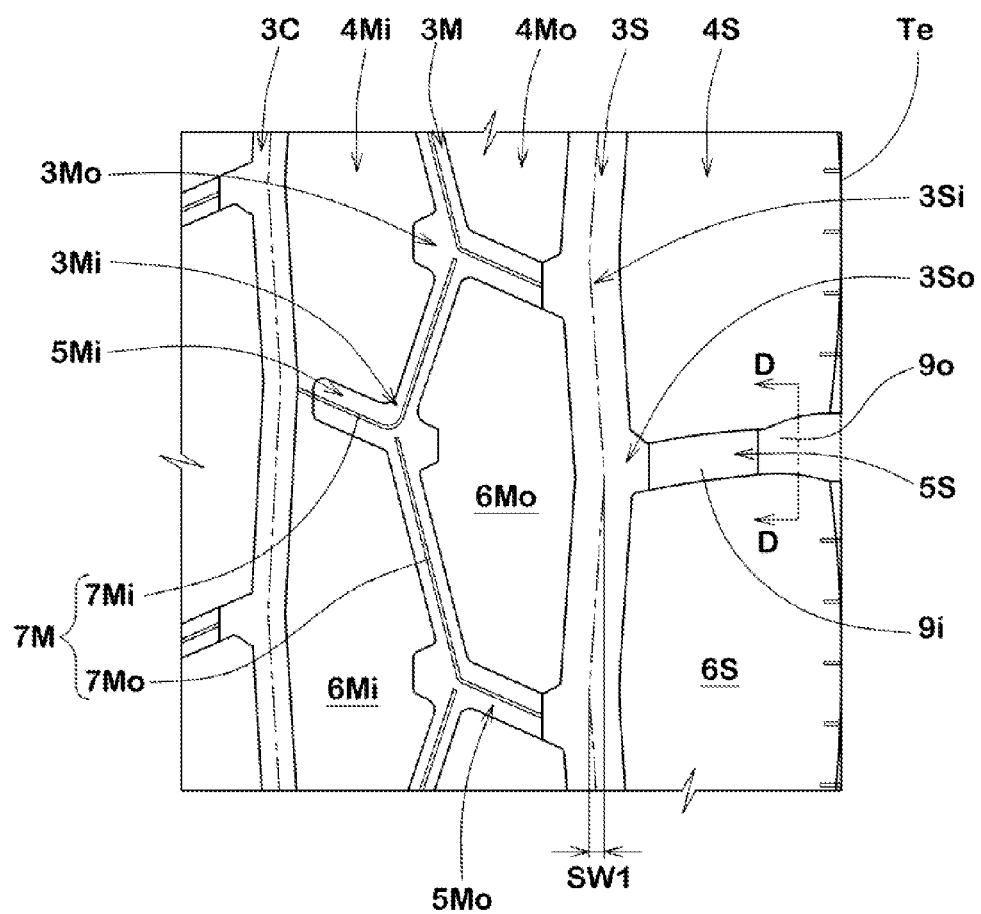
FIG. 4 is a partial enlarged view showing around an outer middle land portion of FIG. 1.

As shown in FIG. 1, each shoulder main groove 3S is arranged nearby each tread edge Te. As shown in FIG. 4, each shoulder main groove 3S extends in a zigzag manner so as to have an axially innermost protruding portion 3Si and an axially outermost protruding portion 3So.

As shown in FIG. 3, each middle main groove 3M is arranged between the crown main groove 3C and the shoulder main groove 3S on each side of the tire equator C. Each middle main groove 3M extends in a zigzag manner so as to have an axially innermost protruding portion 3Mi and an axially outermost protruding portion 3Mo. Due to these main grooves 4, the tread portion 2 is separated into a plurality of land portions 4.

In this embodiment, the land portions 4 include a crown land portion 4C arranged between the crown main grooves 3C and 3C, a pair of axially inner middle land portions 4Mi each arranged between the crown main groove 3C and the middle main groove 3M, a pair of axially outer middle land portions 4Mo each arranged between the middle main groove 3M and the shoulder main groove 3S, and a pair of shoulder land portions 4S each arranged between the shoulder main groove 3S and the tread edge Te. These inner middle land portion 4Mi and the outer middle land portion 4Mo may be collectively called as a middle land portion 4M.

The tread edge Te is defined as an axially outer edge in a ground contact patch of the tread portion 2 under a standard loaded condition in which the tire 1 is mounted on a standard wheel rim with a standard pressure and is loaded with a standard tire load at a camber angle of set to zero.

In this application including specification and claims, various dimensions, positions and the like of the tire refer to those under a standard unloaded condition of the tire unless otherwise noted. The standard unloaded condition is such that the tire 1 is mounted on the standard wheel rim with the standard pressure and is loaded with no tire load. The axial distance between the tread edges Te and Te of the tire in the standard unloaded condition is defined as a tread width TW.

Here, the standard wheel rim is a wheel rim officially approved or recommended for the tire by standards organizations, i.e. JATMA, TRA, ETRTO, and the like which are effective in the area where the tire is manufactured, sold or used. For example, the standard wheel rim is the "standard rim" specified in JATMA, the "Measuring Rim" in ETRTO, and the "Design Rim" in TRA or the like.

The standard pressure and the standard tire load are the maximum air pressure and the maximum tire load for the tire specified by the same organization in the Air-pressure/Maximum-load Table or similar list.

The standard pressure is the "maximum air pressure" in JATMA, the "Inflation Pressure" in ETRTO, and the maximum pressure given in the "Tire Load Limits at Various Cold Inflation Pressures" table in TRA or the like.

The standard tire load is the "maximum load capacity" in JATMA, the "Load Capacity" in ETRTO, and the maximum value given in the above-mentioned table in TRA or the like.

Figure 2:
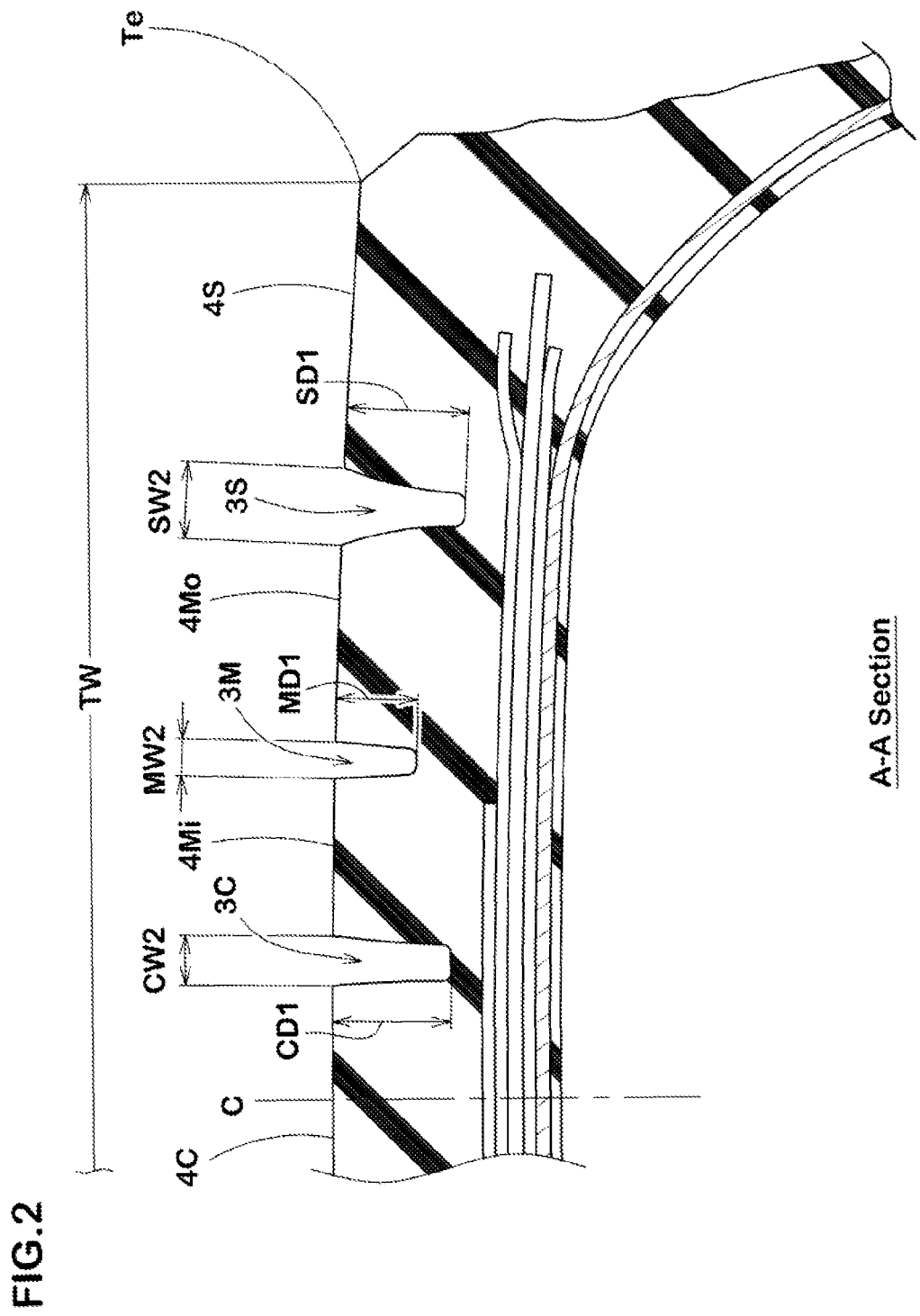
FIG. 2 is a cross sectional view taken along a line A-A of FIG. 1.

FIG. 2 illustrates a cross sectional view taken along a line A-A of FIG. 1. As shown in FIG. 2, the crown main groove 3C has a groove width CW2. The shoulder main groove 3S has a groove width SW2. In order to improve drainage performance while maintaining rigidity of the tread portion 2, the groove width CW2 and the groove width SW2 are preferably set in a range of from 2%6 to 4% of the tread width TW. Similarly, the middle main groove 3M preferably has a groove width MW2 in a range of from 1% to 3% of the tread width TW.

The crown main groove 3C and the shoulder main groove 3S have a groove depth CD1 and a groove depth SD1, respectively. In the same point of view described above, the groove depth CD1 and the groove depth SD1 are preferably set in a range of not less than 10.0 mm, more preferably not less than 12.0 mm, but preferably not more than 22.0 mm, more preferably not more than 20.0 mm.

Referring back to FIG. 1, the respective land portions 4 are provided with a plurality of lateral grooves 5. In this embodiment, the lateral grooves 5 include crown lateral grooves 5C, axially inner middle lateral grooves 5Mi, axially outer middle lateral grooves 5Mo, and shoulder lateral grooves 5S.

Referring to FIG. 3, the crown lateral grooves 5C are arranged on the crown land portion 4C. In this embodiment, each crown lateral grooves 5C extends to communicate between the axially innermost protruding portions 3Ci of the crown main grooves 3C and 3C to form a plurality of crown block elements 6C.

Preferably, each crown lateral groove 5C has an angle in a range of from 55 to 75 degrees with respect to the circumferential direction of the tire to generate laterally and longitudinally high friction force against the road by the groove edge while maintaining drainage performance.

Figure 5:
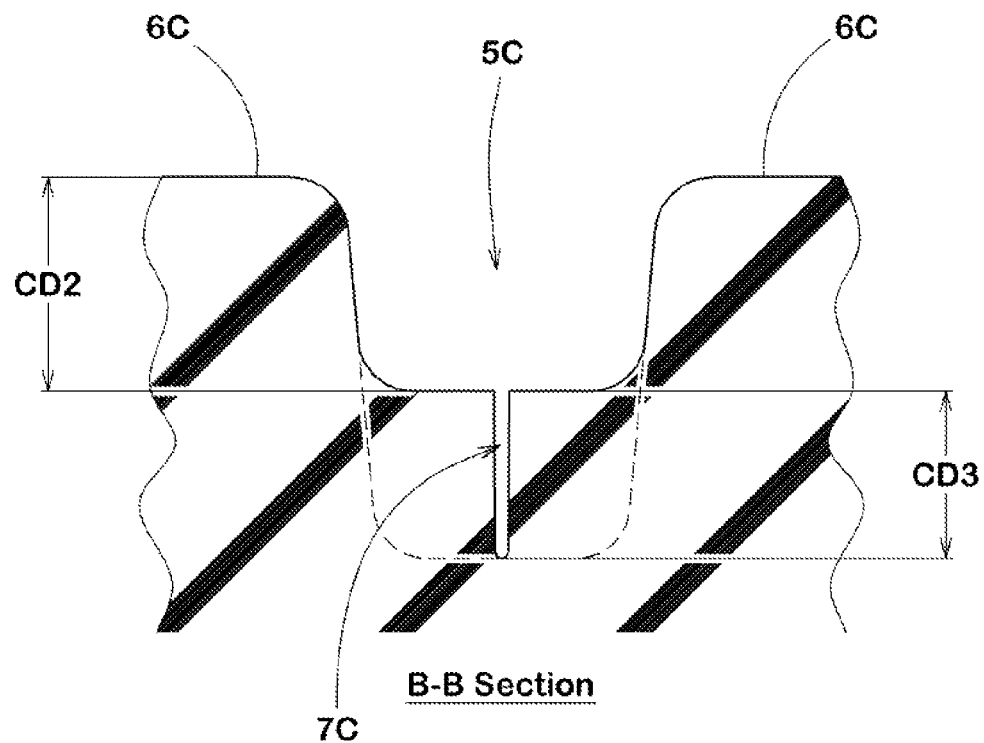
FIG. 5 is a cross sectional view taken along a line B-B of FIG. 3.

FIG. 5 illustrates a cross sectional view taken along a line B-B of FIG. 3. Preferably, the crown lateral groove 5C has a groove depth CD2 in a range of from 55% to 70% of the groove depth CD1 of the crown main groove 3C to enhance the circumferential rigidity of the crown land portion 4C to reduce the energy loss to be generated thereon, thereby improving the rolling resistance of the tire.

In this embodiment, the crown lateral groove 5C is provided with a crown groove bottom sipe 7C that extends on the groove center line of the crown lateral groove 5C. The crown groove bottom sipe 7C may offer the crown land portion 4 with a suitable deformation to reduce the stress to be generated thereon, thereby improving the chipping resistance of the tire.

Preferably, the crown groove bottom sipe 7C has a depth CD3 in a range of from 10% to 50% of the groove depth CD1 of the crown main groove 3C to improve the chipping resistance while maintaining low rolling resistance.

As shown in FIG. 4, each shoulder lateral groove 5S is arranged on the shoulder land portion 4S. In this embodiment, each shoulder lateral groove 5S extends from the shoulder main groove 3S to the tread edge Te to form a plurality of shoulder block elements 6S. Preferably, the shoulder lateral groove 5S extends substantially along the axial direction of the tire from the axially outermost protruding portion 3So of the shoulder main groove 3S.

Figure 6:
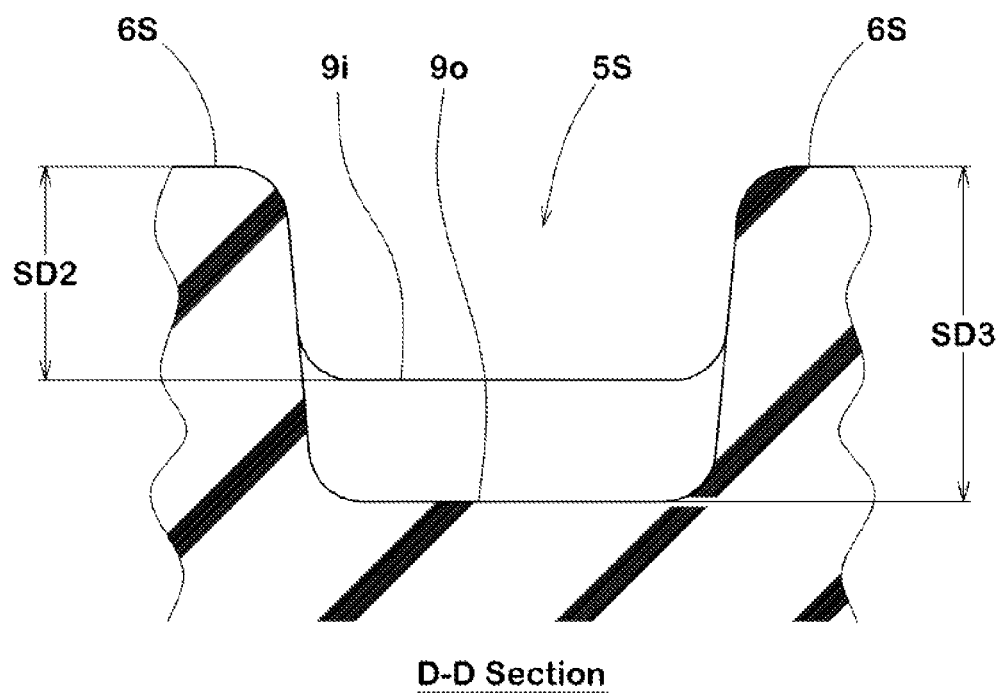
FIG. 6 is a cross sectional view taken along a line D-D of FIG. 4.

FIG. 6 illustrates a cross sectional view taken along a line D-D of FIG. 4. As shown in FIGS. 4 and 6, the shoulder lateral groove 5S may include a deep portion 9o having a groove depth SD3, and a shallow portion 9i having a groove depth SD2 smaller than the groove depth SD3. In this embodiment, the shallow portion 9i is arranged axially inwardly within the shoulder lateral groove 5S.

Preferably, the groove depth SD2 of the shallow portion 9i is set in a range of from 15% to 70%, more preferably in a range of from 55% to 70% of the groove depth CD1 of the crown main groove 3C. Preferably, the groove depth SD3 of the deep portion 9o is set in the same range of the groove depth CD1 of the crown main groove 3C. The shallow portion 9i may enhance the circumferential rigidity of the shoulder land portion 4S, thereby improving the rolling resistance of the tire. Upon traveling on wet road, the shallow portion 9i may accelerate the velocity of the water coming from the shoulder main groove 3S and push it out from the tread edge Te through the deep portion 9o, thereby improving wet performance of the tire.

In this embodiment, the shoulder lateral grooves 5S are not provided with any groove bottom sipe. This may help to improve steering stability and low rolling resistance of the tire.

As shown in FIG. 3, the inner middle lateral grooves 5Mi are arranged on the inner middle land portion 4Mi. In this embodiment, each inner middle lateral groove 5Mi extends from the axially innermost protruding portion 3Mi of the middle main groove 3M toward the axially outermost protruding portion 3Co without reaching the crown main groove 3C to form a plurality of axially inner middle block elements 6Mi. These inner middle block elements 6Mi are circumferentially connected one another at its axially inner side. In this embodiment, the circumferential rigidity of the inner middle land portion 4Mi may be enhanced.

Preferably, each inner middle lateral groove 5Mi has an angle of from 55 to 75 degrees with respect to the circumferential direction of the tire. Preferably, each inner middle lateral groove 5Mi inclines in an opposite direction to the crown lateral grooves 5C. Thus, the tire in accordance with the present invention may generate high friction force during cornering using groove edges of the crown lateral grooves 5C and the inner middle lateral grooves 5Mi regardless of steering direction.

Figure 7:
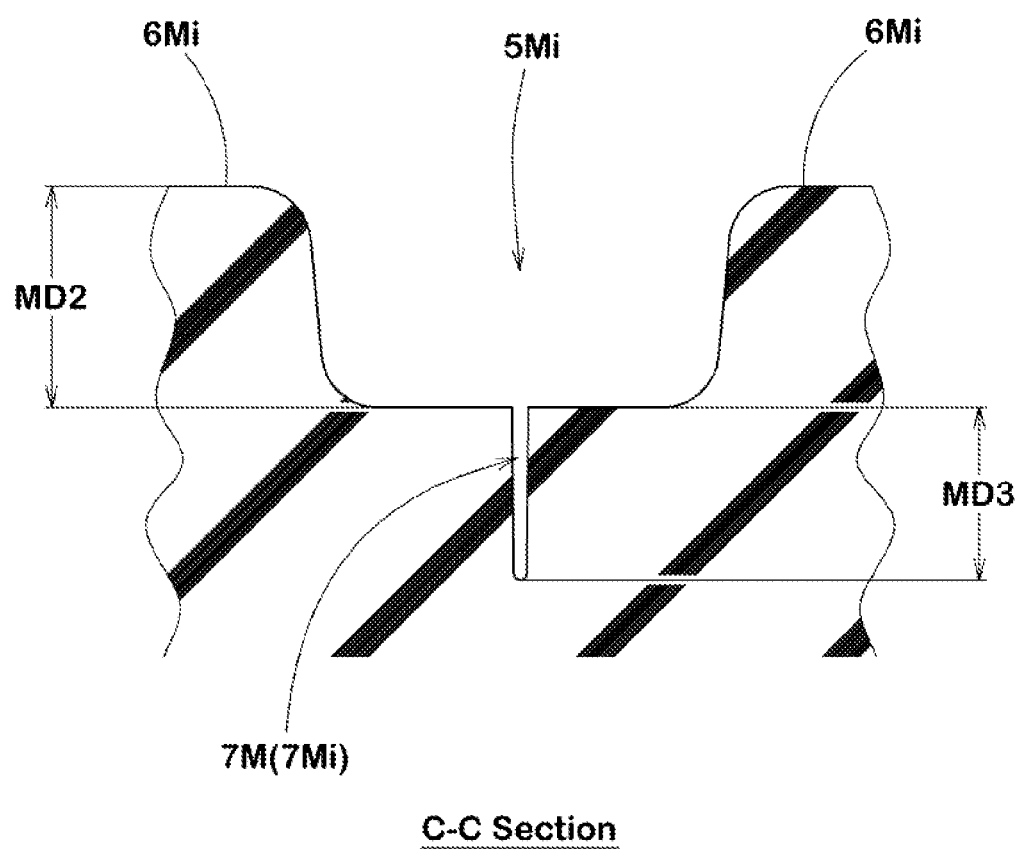
FIG. 7 is a cross sectional view taken along a line C-C of FIG. 3.

FIG. 7 illustrates a cross sectional view taken along a line C-C of FIG. 3. As shown in FIGS. 3 and 7, each inner middle lateral groove 5Mi preferably has a groove depth MD2 in the same range of the groove depth CD2 of the crown lateral groove 5C to enhance the circumferential rigidity of the inner middle land portion 4Mi so that the rolling resistance improves.

Referring back to FIG. 3, the outer middle lateral grooves 5Mo are arranged on the outer middle land portion 4Mo. In this embodiment, each outer middle lateral groove 5Mo extends from the axially outermost protruding portion 3Mo of the middle main groove 3M to the axially innermost protruding portion 3Si of the shoulder main groove 3S to form a plurality of axially outer middle block elements 6Mo. Preferably, each outer middle lateral groove 5Mo has an angle of from 55 to 75 degrees with respect to the circumferential direction of the tire.

Preferably, each outer middle lateral groove 5Mo has a groove depth (not shown) in the same range of the groove depth MD2 of the inner middle lateral groove 5Mi to enhance the circumferential rigidity of the outer middle land portion 4Mo so that the rolling resistance improves.

In order to improve the wet performance and rolling resistance of the tire, the tread portion 2 preferably has a land ratio in a range of from 70% to 85%. Here, the land ratio of the tread portion 2 means a ratio of a net ground contact area to a gross total ground contact area of the tread portion 2, wherein the gross total ground contact area is obtained by plugging up the whole grooves of the tread portion 2. When the land ratio is less than 70%, the rolling resistance of the tire may be deteriorated by large rubber deformation, which generates a large amount of energy loss, of the tread portion 2 during traveling. When the land ratio is more than 85%, the wet performance of the tire may be deteriorated.

As shown in FIG. 1, each lateral groove 5 of one of the land portions 4 is arranged to be shifted by a substantially half length of the pitch P to each lateral groove 5 of the other one of the land portions 4 adjacent to the concerned land portion 4. For instance, each inner middle lateral groove 5Mi is arranged to be shifted by the substantially half length of the pitch P to each crown lateral groove 5C. Furthermore, each outer middle lateral groove 5Mo is arranged to be shifted by the substantially half length of the pitch P to each inner middle lateral groove 5Mi. Furthermore, each shoulder lateral groove 5S is arranged to be shifted by the substantially half length of the pitch P to each outer middle lateral groove 5Mo. These arrangements of lateral grooves may provide the respective land portions each in which wide width portions and narrow width portions are repeated in the circumferential direction of the tire. Such a tread portion 2 having lateral grooves arrangements may improve the rolling resistance of the tire by lowering the deformation of respective land portions 4.

Here, the pitch P means a design unit of the tread pattern that consists of one block element 6 and one lateral groove 5 adjacent to the concerned block element 6. The substantially half length of the pitch includes a length in a range of from 40% to 60% of the length of the pitch P, at least.

Preferably, each land portion 4 includes a number of pitches P in a range of from 40 to 50. The tire in accordance with the present embodiment has less pitches than conventional heavy duty pneumatic tires having a number of pitches of about 60 or more. Thus, the tire in accordance with the present embodiment may have land portions 4 having high circumferential rigidity, thereby lowering the rolling resistance.

Preferably, each block element 6 has a circumferential length in a range of from 85% to 95% of the circumferential length of the pitch P in order to further improve the rolling resistance while maintaining the wet performance of the tire.

As shown in FIGS. 1, 3 and 4, the middle main groove 3M has a zigzag amplitude MW1 larger than both of a zigzag amplitude CW1 of the crown main groove 3C and a zigzag amplitude SW1 of the shoulder main groove 3S. Generally, since a large contact pressure acts on the middle land portion 4M during straight traveling and cornering, a chipping tends to generate thereon. In this embodiment, the middle land portion 4M may exhibit an excellent chipping resistance since the stress to be generated therein is relaxed by offering a suitable deformation on the middle land portion 4M during traveling.

Preferably, zigzag amplitudes CW1 and SW1 of the crown main groove 3C and the shoulder main groove 3S respectively are preferably in a range of from 1% to 3% of the tread width TW in order to improve drainage performance and tire traction force.

Preferably, the zigzag amplitude MW1 of the middle main groove 3M is preferably in a range of from 3% to 5% of the tread width TW in order to improve the chipping resistance of the middle land portion 4M while maintaining the lateral rigidity of the inner and outer middle block elements 6Mi and 6Mo.

As shown in FIG. 2, the middle main groove 3M preferably has a groove depth MD1 smaller than both of the groove depths CD1 and SD1 of the crown main groove 3C and the shoulder main groove 3S, respectively. Preferably, the groove depth MD1 of the middle main groove 3M is in a range of not less than 4.0 mm, more preferably not less than 6.0 mm, but preferably not more than 13.0 mm, more preferably not more than 11.0 mm.

Preferably, the respective groove bottoms of middle main groove 3M, inner middle lateral grooves 5Mi and outer middle lateral grooves 5Mo are provided with a groove bottom sipe 7M in order to improve the chipping resistance of the tire, as shown in FIG. 3.

In this embodiment, the groove bottom sipe 7M comprises a first groove bottom sipe 7Mi and a second groove bottom sipe 7Mo.

The first groove bottom sipe 7Mi extends from a bottom of the middle main groove 3M to a bottom of the axially inner middle lateral groove 5Mi. Preferably, the first groove bottom sipe 7Mi extends on a position 8*i* where the middle main groove 3M and the axially inner middle lateral groove 5Mi are connected at an acute angle.

The second groove bottom sipe 7Mo extends from the bottom of the middle main groove 3M to a bottom of the axially outer middle lateral groove 5Mo. Preferably, the second groove bottom sipe 7Mo extends on a position 8*o* where the middle main groove 3M and the axially outer middle lateral groove 5Mo are connected at an obtuse angle.

Since the first and second groove bottom sipes 7Mi and 7Mo provide a suitable rigidity with the inner middle land portion 4Mi and the outer middle land portion 4Mo by offering flexibility for relaxing the stress, the chipping resistance of the inner middle land portion 4Mi and the outer middle land portion 4Mo may be improved. Furthermore, the inner middle land portion 4Mi is generally subjected to a large contact pressure compared to the outer middle land portion 4Mo. In this embodiment, the position 8*i* of an acute angle of the first groove bottom sipe 7Mi may effectively relax the stress to be acted on the inner middle land portion 4Mi during traveling, thereby further improving the chipping resistance.

Preferably, the first groove bottom sipe 7Mi and the second groove bottom sipe 7Mo are alternately arranged in the circumferential direction of the tire. The first groove bottom sipe 7Mi and the second groove bottom sipe 7Mo are arranged without communicating one another so that the middle land portion 4M may not have excessive low circumferential rigidity. This may help to further improve the rolling resistance.

Preferably, the groove bottom sipe 7Mi has a depth (shown in FIG. 11) from a tread ground contact surface to its bottom in a range of from 70% to 90% of the groove depth CD1 of the crown main groove 3C. Preferably, the second groove bottom sipe 7Mo also has the same depth of the groove bottom sipe 7Mi.

Second Embodiment

Next, the second embodiment of the present invention will be explained below with reference to the accompanying drawings. In the disclosure for the second embodiment, it should be noted that the explanation of elements already described above is omitted.

Figure 8:
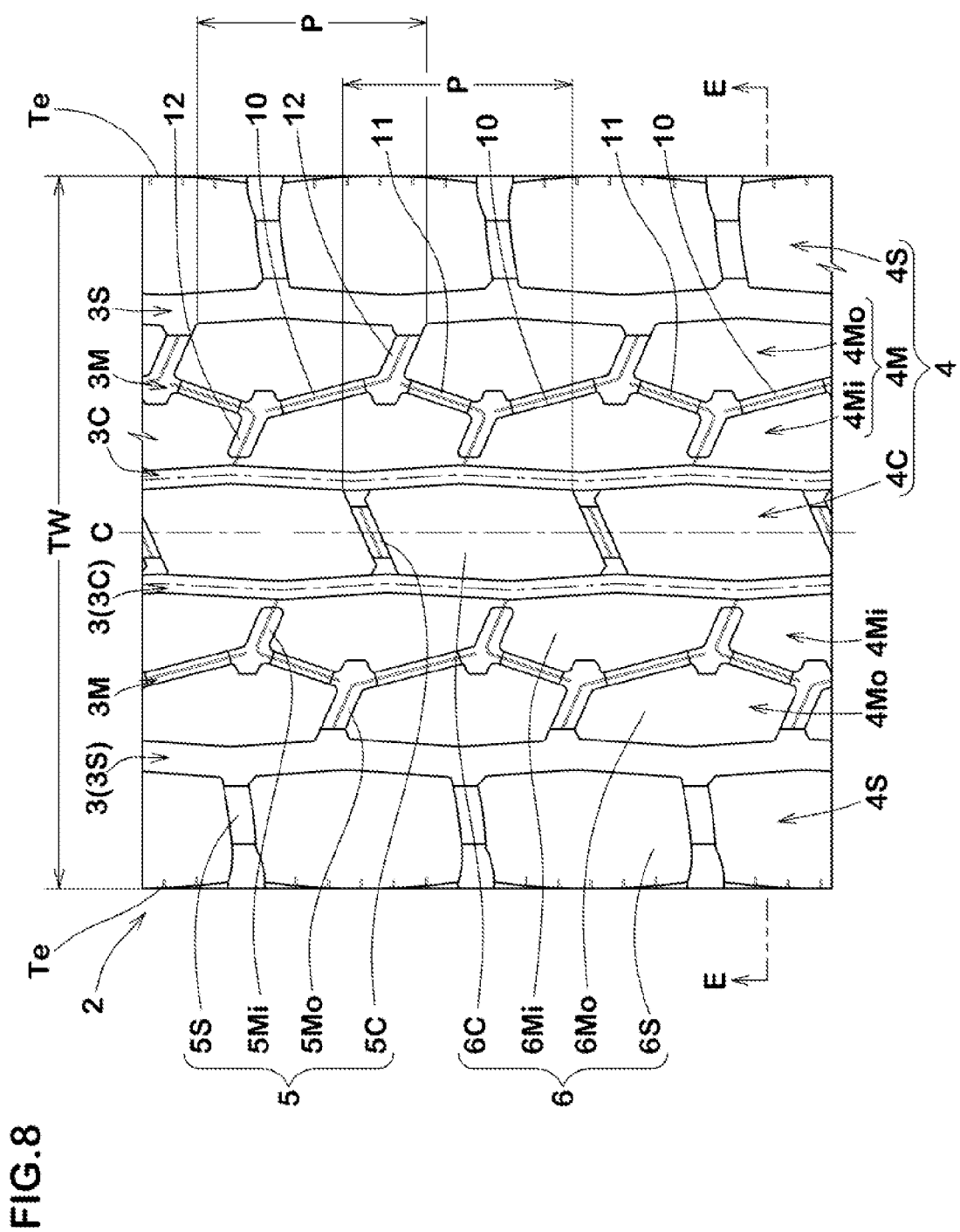
FIG. 8 is a development view of a tread portion of a heavy duty pneumatic tire in accordance with a second embodiment of the present invention.
Figure 9:
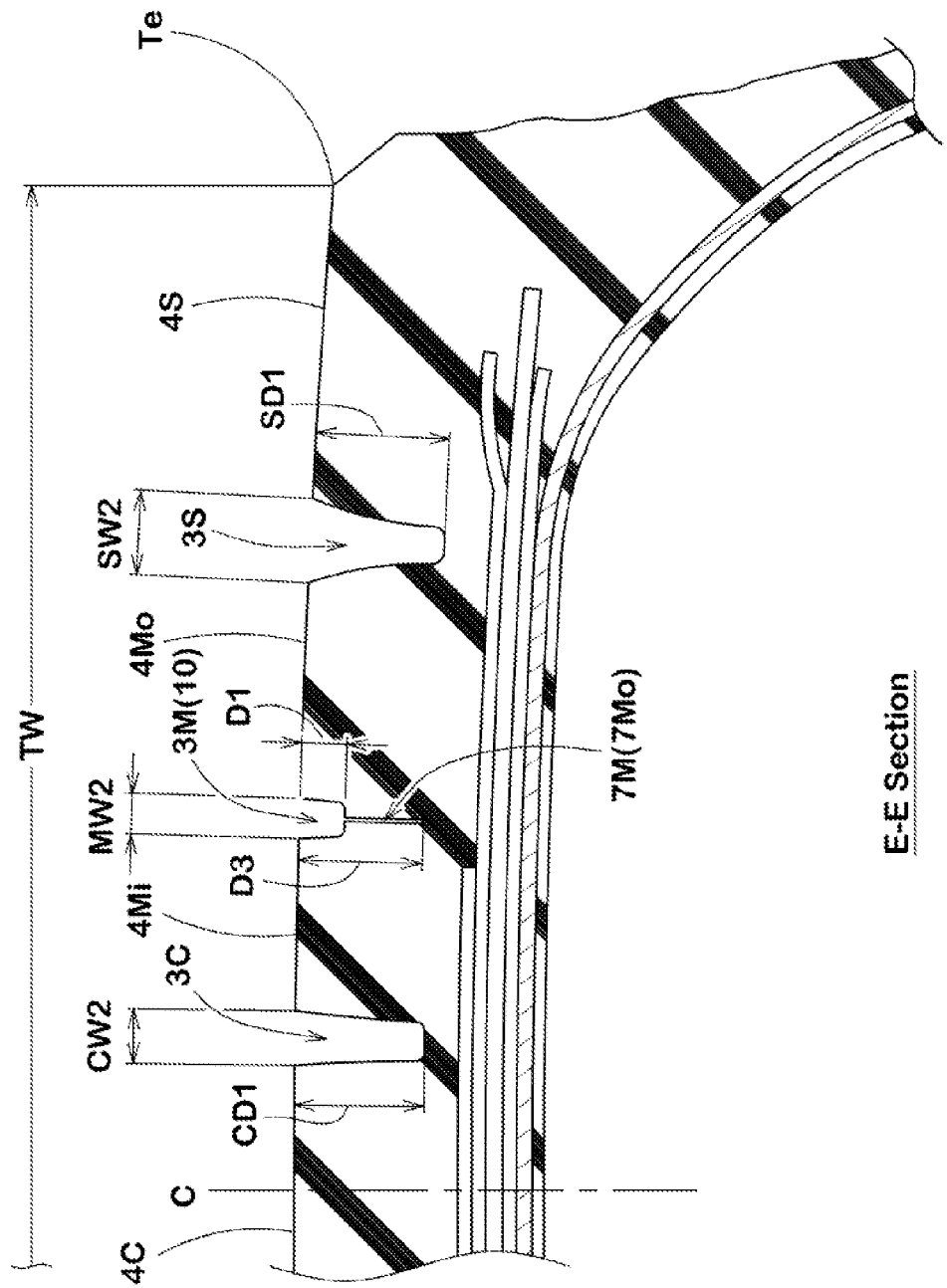
FIG. 9 is a cross sectional view taken along a line E-E of FIG. 8.
Figure 10:
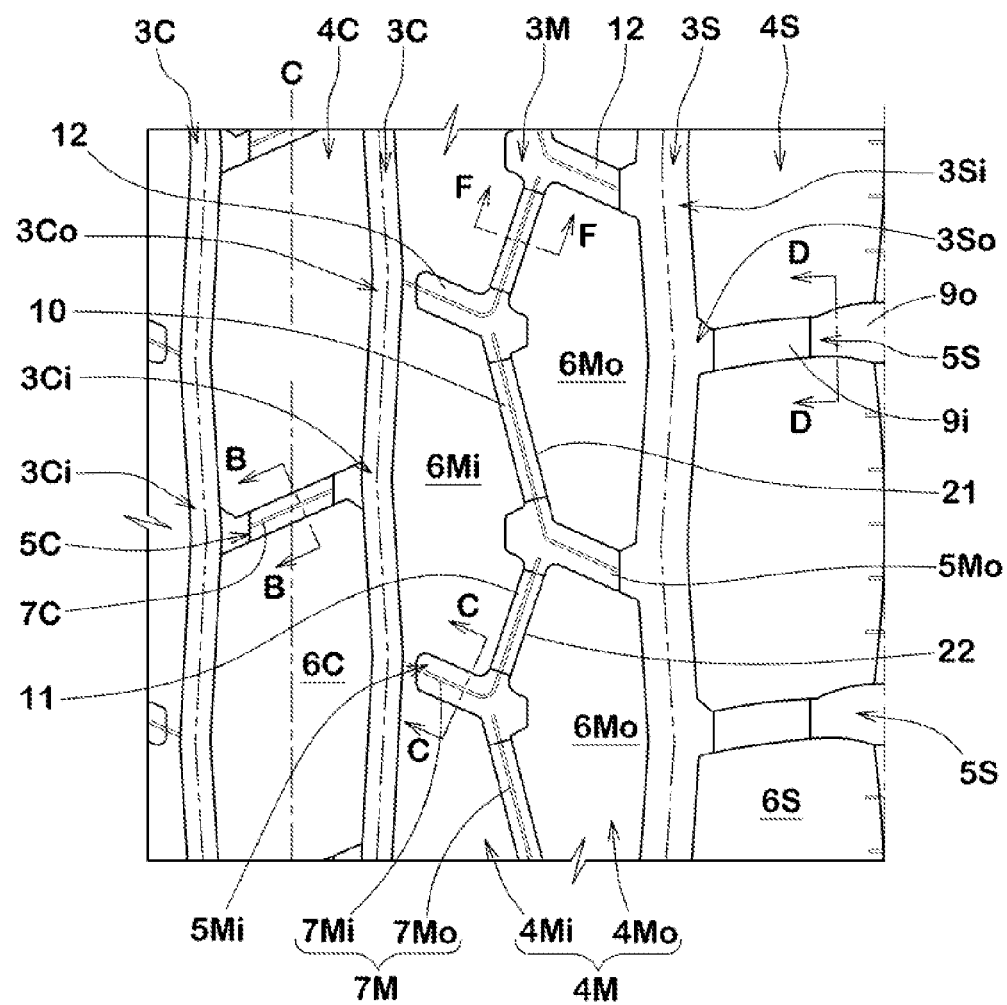
FIG. 10 is a partial enlarged view showing around a middle land portion of FIG. 8.
Figure 11:
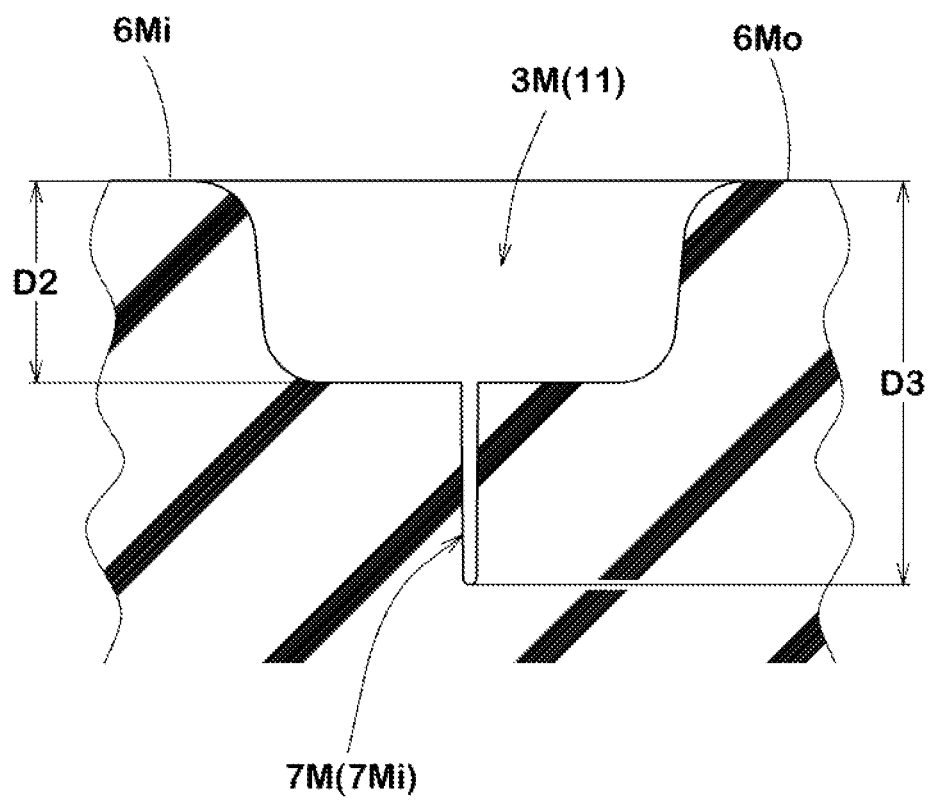
FIG. 11 is a cross sectional view taken along a line F-F of FIG. 10.

FIG. 8 illustrates a development view of a tread portion of a heavy duty pneumatic tire in accordance with a second embodiment of the present invention. FIG. 9 illustrates a cross sectional view taken along a line E-E of FIG. 8. FIG. 10 illustrates a partial enlarged view showing around a middle land portion of FIG. 8. FIG. 11 illustrates a cross sectional view taken along a line F-F of FIG. 10. Here, cross sections taken along lines B-B, C-C and D-D of FIG. 10 have already been illustrated in FIGS. 5, 7, and 6, respectively.

As shown in FIGS. 8 to 10, each of the middle main grooves 3M is provided with a first connecting portion 10 and the second connecting portion 11.

In this embodiment, the middle main groove 3M comprises a first inclined element 21, and a second inclined element 22 which is inclined in an opposite direction with respect to the first inclined element 21 and has a circumferential length smaller than that of the first inclined element 21. Preferably, the first connecting portion 10 is provided in the first inclined element 21, and the second connecting portion 11 is provided in the second inclined element 22.

Figure 12:
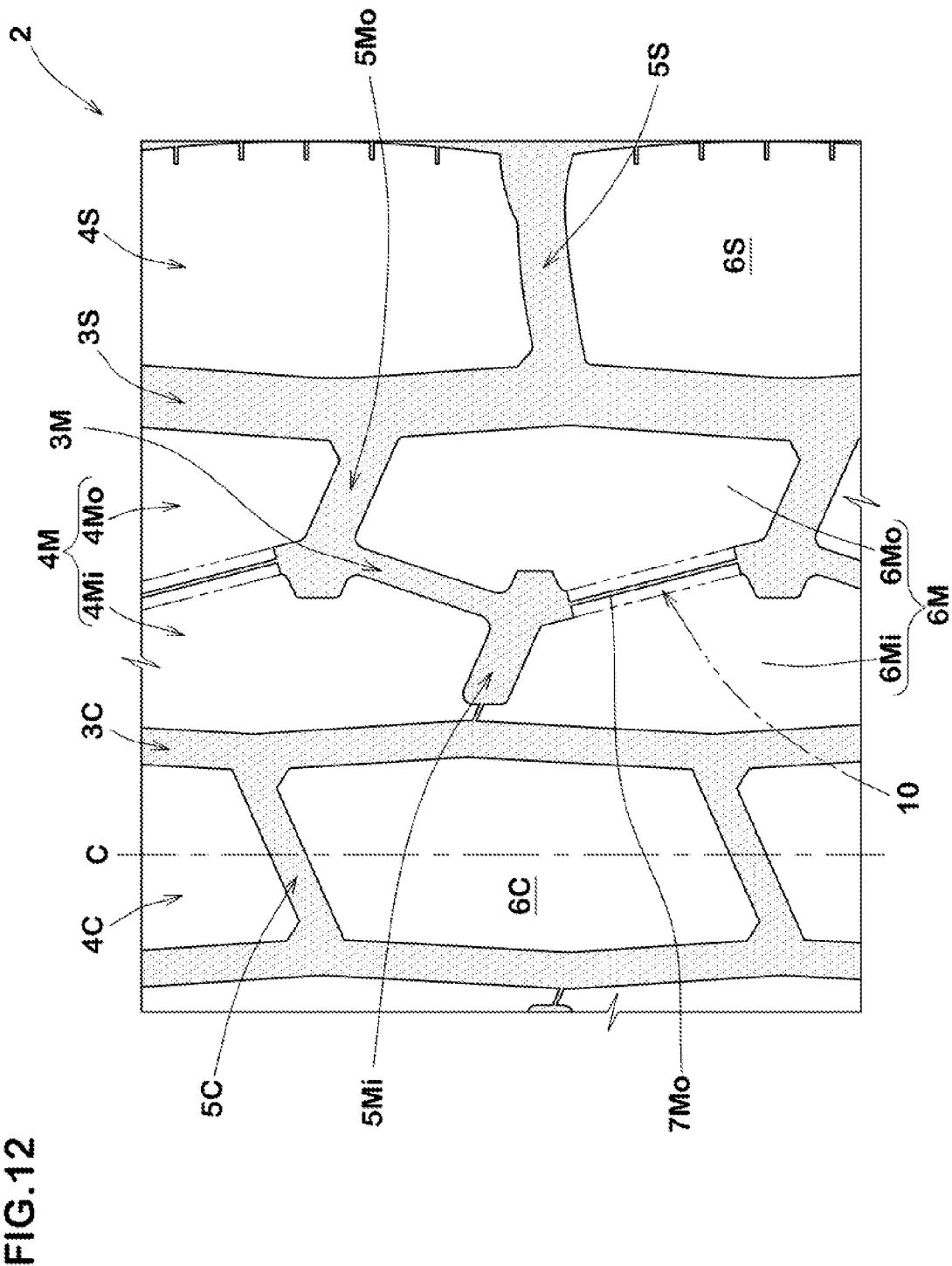
FIG. 12 is a development view of the worn tread portion at a first state.

The first connecting portion 10 is formed so as to raise the groove bottom of the first inclined element 21 at least partially. The first connecting portion 10 may come into contact with the road for the first time when the tread portion 2 is worn as a first state (an initial wear stage). Thus, the first connecting portion 10 may connect the axially inner block element 6Mi with the axially outer middle block element 6Mo. FIG. 12 illustrates the first state of the tread portion 2 where the crown main groove 3C has a groove depth in a range of from 70% to 80% in comparison with the new one. It means that a slightly colored portion in FIG. 12 does not come into contact with the road. As shown in FIG. 12, the middle land portion 4M comprises a plurality of connected blocks 6M which are formed by connecting the inner middle block element 6Mi with the outer middle block element 6Mo.

Typically, the inner middle block elements 6Mi and the outer middle block elements 6Mo tend to wear away easily in comparison with the other block elements. However, since the first connecting portion 10 may increase in rigidity of the middle land portion 4M at the first state described above, the tread portion 2 in accordance with the present embodiment may improve wear resistance on the middle land portion 4M.

As shown in FIG. 9, the first connecting portion 10 preferably has a depth D1 in a range of from 15% to 40%, more preferably in a range of from 20% to 30% of the groove depth CD1 of the crown main groove 3C in order to further improving the wear resistance on the middle land portion 4M while maintaining the wet performance of the tire.

The second connecting portion 11 is formed so as to raise the groove bottom of the second inclined element 22 at least partially. The second connecting portion 11 may come into contact with the road for the first time when the tread portion 2 is worn as a second state (an intermediate wear stage) that comes from later than the first state. Thus, the second connecting portion 11 may connect the circumferentially adjacent connected blocks 6M and 6M so that a middle rib MR is formed.

Figure 13:
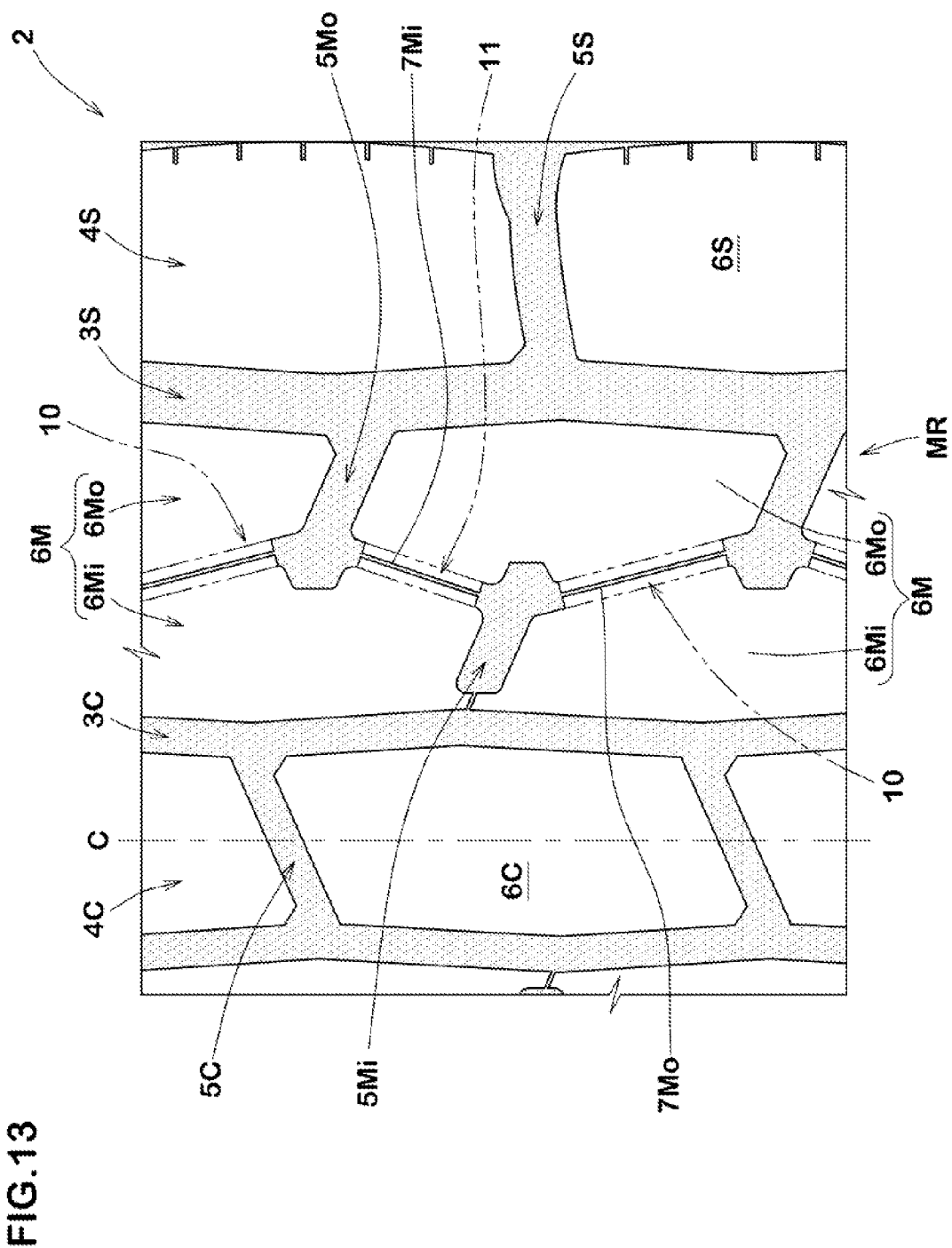
FIG. 13 is a development view of the worn tread portion at a second state.

FIG. 13 illustrates the second state of the tread portion 2 where the crown main groove 3C has a groove depth in a range of from 40 to 60% in comparison with the new one. It means that a slightly colored portion in FIG. 13 does not come into contact with the road. As shown in FIG. 13, the second connecting portion 11 may connect the circumferentially adjacent connected blocks 6M and 6M to form the middle rib MR, thereby further improving the wear resistance of the middle land portion 4M.

As described above, since the rigidity of the middle land portion 4M increases in stages with increasing the amount of wear, uneven wear to be generated thereon is prevented so that a long tire life is ensured. In addition, the first and second connecting portions 11 and 12 may enhance in rigidity of the middle land portion 4M to reduce the amount of the deformation of the tread portion 2, the energy loss to be generated therein may be decreased so that the low rolling resistance is ensured.

As shown in FIG. 11, the second connecting portion 11 preferably has a depth D2 larger than that of the first connecting portion 10 and smaller than the groove depths of respective lateral grooves 5. In this embodiment, the second connecting portion 11 has the depth D2 in a range of from 30% to 60%, more preferably in a range of from 40% to 60% of the groove depth CD1 of the crown main groove 3C.

Referring back to FIG. 8, the tire in accordance with the present embodiment is provided a third connecting portion 12 with both of the inner middle lateral groove 5Mi and the outer middle lateral groove 5Mo. The third connecting portions 12 are formed so as to raise the groove bottoms of the inner and outer middle lateral grooves 5Mi and 5Mo at least partially.

Figure 14:
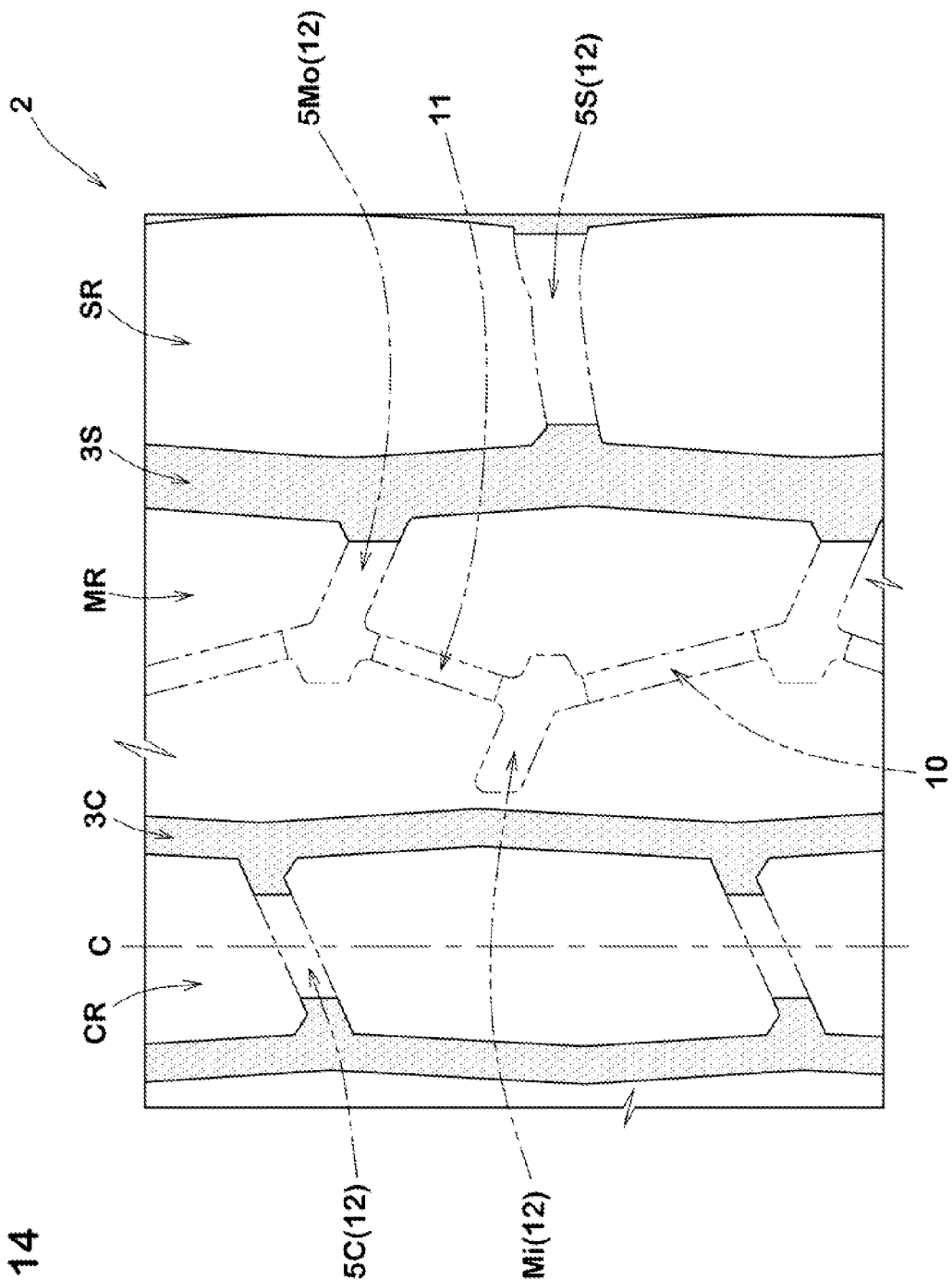
FIG. 14 is a development view of the worn tread portion at a third state.

FIG. 14 illustrates a third state (a final wear stage) of the tread portion 2 where the crown main groove 3C has a groove depth in a range of from 20% to 30% in comparison with the new one. It means that a slightly colored portion in FIG. 14 does not come into contact with the road. As shown in FIG. 14, the third connecting portion 12 may appear on the ground contacting surface of the tread portion 2 for the first time when the tread portion 2 is worn as the third stage so that both of the inner middle lateral grooves 5Mi and the outer middle lateral grooves 5Mo disappear from the ground contacting surface of the tread portion 2. Thus, the rigidity of the middle rib MR is further enhanced. Preferably, the third connecting portion 12 has a depth larger than that of the second connecting portion 11, more preferably in a range of from 55% to 70% of the groove depth CD1 of the crown main groove 3C.

Preferably, the third connecting portion 12 is arranged in the crown lateral grooves 5C or the shoulder lateral grooves 5S by raising the groove bottom thereof at least partially. In this embodiment, the third connecting portion 12 may connect the respective adjacent crown block elements 6C so as to form a crown rib CR, or may connect the respective adjacent shoulder block elements 6S so as to form a shoulder rib SR. Accordingly, uneven wear to be generated on the crown block elements 6C or the shoulder block elements 6S may be prevented at the third stage.

Preferably, the groove bottom sipe 7M is arranged on the respective groove bottoms of the middle main groove 3M, the inner middle lateral groove 5Mi and the outer middle lateral groove 5Mo, as shown in FIG. 10.

Third Embodiment

Next, the third embodiment of the present invention will be explained below with reference to the accompanying drawings of FIGS. 15 to 18. In the disclosure for the third embodiment, it should be noted that the explanation of elements already described above is omitted.

Figure 15:
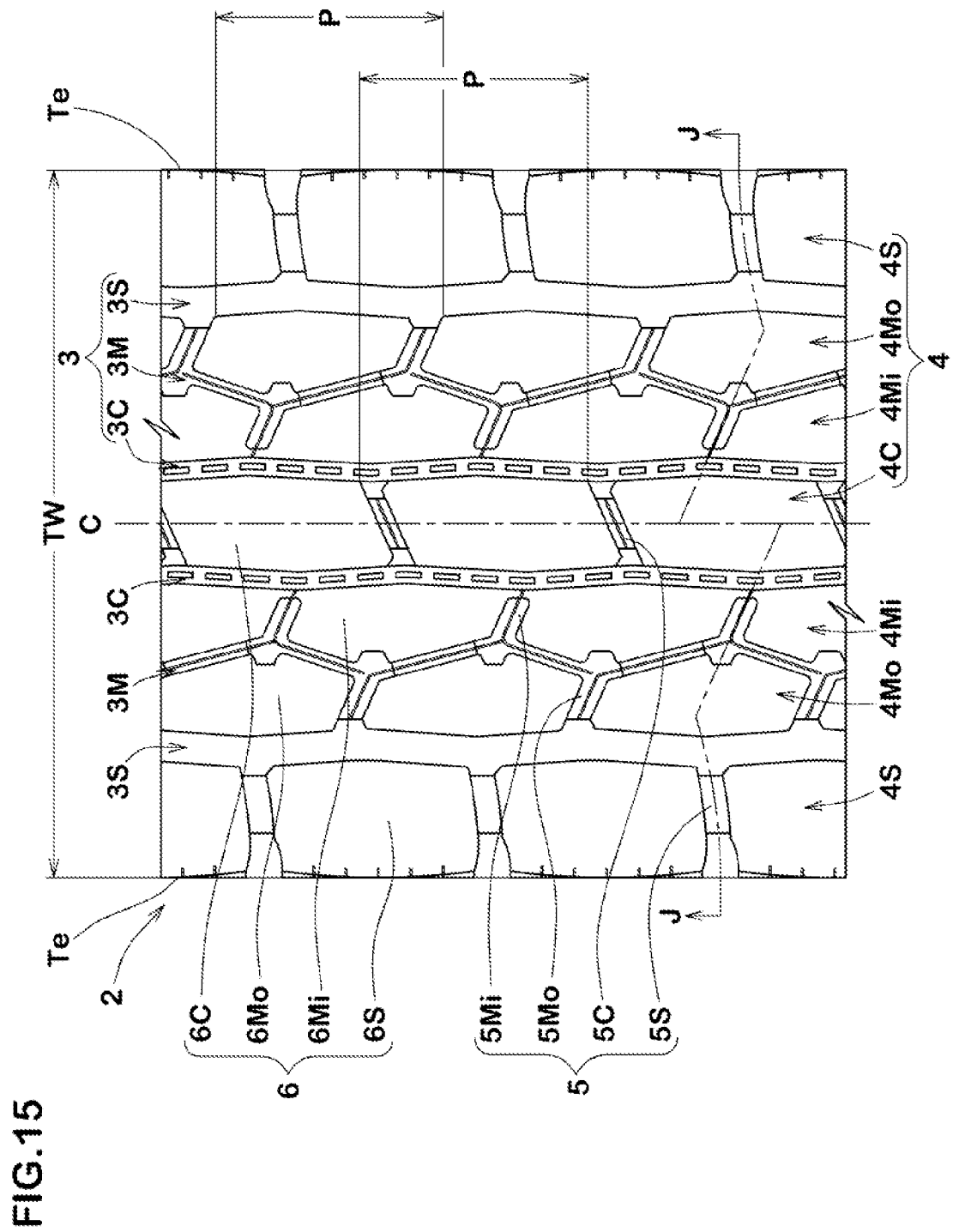
FIG. 15 is a development view of a tread portion of a heavy duty pneumatic tire in accordance with a third embodiment of the present invention.
Figure 16:
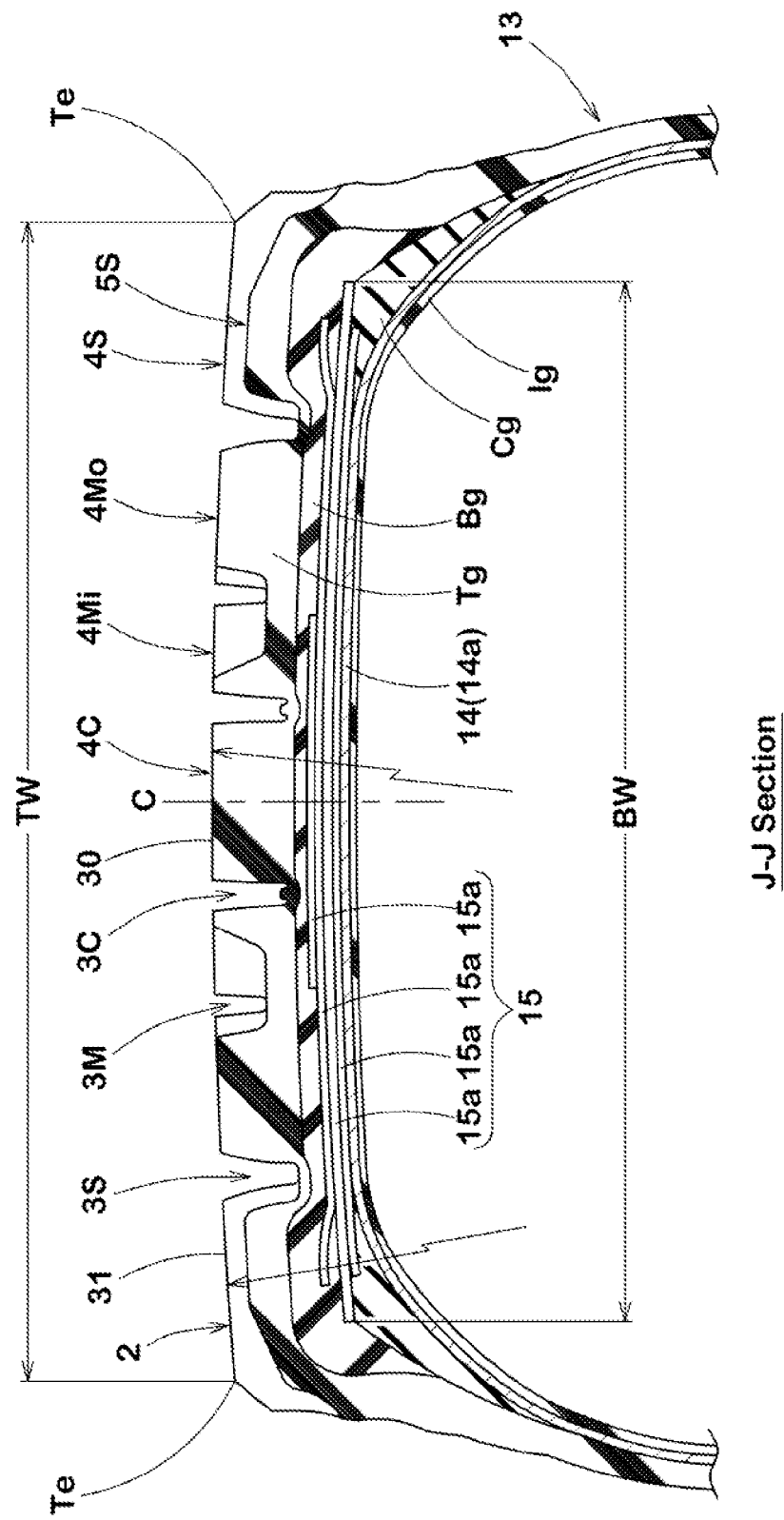
FIG. 16 is a cross sectional view taken along a line J-J of FIG. 15.

FIG. 16 illustrates a cross sectional view taken along a line J-J of FIG. 15. As shown in FIG. 16, the tire in accordance with the present embodiment comprises a carcass 14 and a belt 15 disposed radially outward of the carcass 14 in the tread portion 2.

In this embodiment, the carcass 14 comprises one carcass ply 14a extending between bead portions (not shown) through sidewall portions 13 and the tread portion 2. The carcass ply 14a comprises a plurality of carcass cords that are arranged at angle of 80 to 90 degrees with respect to the circumferential direction of the tire, for instance. As for the carcass cords, a steel cord may be preferably used.

In this embodiment, the belt 15 comprises four belt plies 15a each of which comprises a plurality of inclined steel belt cords that are arranged at angle with respect to the circumferential direction of the tire. The belt 15 includes at least one pair of belt plies 15a that are overlapped so that belt cords of each plies are crossed. Preferably, the belt 15 includes an axial maximum width BW in a range of from 80% to 95% of the tread width TW in order to offer an optimum contact pressure with the tread edges Te.

Furthermore, the tire in accordance with the present embodiment comprises an inner liner layer Ig disposed inward of the carcass 14 to form an inner surface of the tire, a tread base rubber Bg disposed radially outside the belt 15, a tread cap rubber Tg disposed radially outside the tread base rubber Bg and a cushion rubber Cg disposed between the carcass 14 and a portion of axially outward of the belt 15.

In this embodiment, the ground contact surface of the tread portion 2, which is formed of the tread cap rubber Tg, has an arc-shaped profile that comprises a crown arc 30 passing through the tire equator C and a pair of shoulder arcs 31 each arranged axially outside the crown are 30.

Preferably, the crown arc 30 has a radius of curvature in a range of from 500 to 1500 mm, which is larger than the conventional one as a heavy duty pneumatic tire, in order to offer an optimum contact pressure with a crown portion of the tread portion 2. Preferably, the shoulder arc 31 has a radius of curvature in a range of from 30% to 50% of the radius of the crown arc 30.

In this embodiment, the tire has a contact pressure P1 of the crown land portion 4C in a range of not less than 102%, more preferably not less than 105%, but preferably not more than 113%, more preferably not more than 110% of a contact pressure P2 of the middle land portion 4M, in the standard loaded condition. Furthermore, the tire has the contact pressure P2 of the middle land portion 4M, which includes the inner middle land portion 4Mi and the outer middle land portion 4Mo, is in a range of not less than 135%, more preferably not less than 138%, but preferably not more than 145%, more preferably not more than 142% of a contact pressure P3 of the shoulder land portion, in the standard loaded condition. The respective contact pressure P1, P2 and P3 is the respective pressure that is subjected to the ground contacting surface of the respective land portions 4C, 4M and 4S, and may be measured using a pressure mapping measuring apparatus produced by Tekscan, Inc. for example. This apparatus may capture tire footprint pressure pattern by grids of intervals of 1.5 mm and map it. The respective contact pressure P1 to P3 is defined as an average contact pressure on the whole circumferential length of each land portion.

By offering the contact pressure P1 to P3 on the respective land portion, a slip between each land portion 4 and the road may be reduced so that punch wear and shoulder wear is prevented. Furthermore, by offering the relative low contact pressure P1 on the crown land portion 4C, the energy loss to be generated therein may be lowered so that the rolling resistance is further improved.

The respective contact pressure of the crown land portion 4C, inner middle land portion 4Mi, outer middle land portion 4Mo and shoulder land portion 4S may be changed by means of adjusting one of the radii of the crown arc 30 and the shoulder arc 31, a thickness of the tread portion at the position of the shoulder main groove 3S, and a composition of the cushion rubber Cg, for example. In another aspect of the embodiment, the cushion rubber Cg may be arranged to be shifted axially inwardly with respect to an arbitrary standard position to increase the contact pressure P3 of the shoulder land portion 4S. On the other hand, the cushion rubber Cg may be arranged to be shifted axially outwardly with respect to the arbitrary standard position to decrease the contact pressure P3 of the shoulder land portion 4S.

Figure 17:
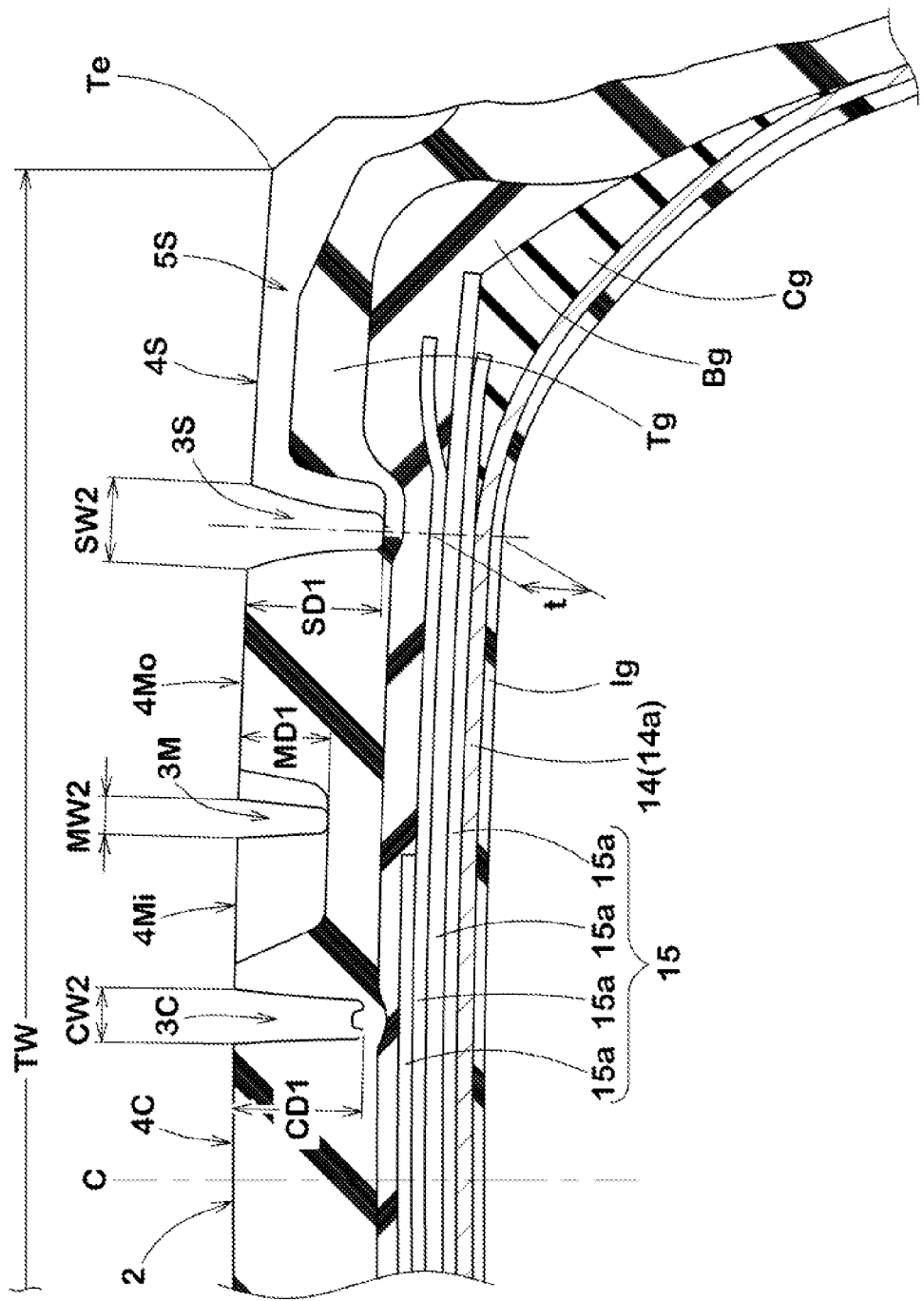
FIG. 17 is an enlarged view of FIG. 10.

As shown in FIG. 17, a thickness t from an outer surface of the belt 15 to a tire inner surface at an axial position of the shoulder main groove 3S is in a range of not less than 8 mm, more preferably not less than 10 mm, but preferably not more than 16 mm, more preferably not more than 14 mm in order to maintain the contact pressure P3 of the shoulder land portion 4S in a suitable range to prevent not only the punch wear on the middle land portion 4M but also the shoulder wear.

Preferably, a land ratio of the crown land portion 4C is not less than a land ration of the shoulder land portion 4S in order to increase in rigidity of the crown land portion 4C so that the rolling resistance of the tire is further improved. Preferably, the respective land ratios of the inner middle land portion 4Mi and the outer middle land portion 4Mo is less than the land ratio of the shoulder land portion 4S in order to improve wet performance of the tire. Each land ratio of the land portions 4 is defined as a ratio of the net ground contact surface area to the gross ground contact area that is obtained by plugging up the whole lateral grooves 5 on the concerned land portion.

Figure 18:
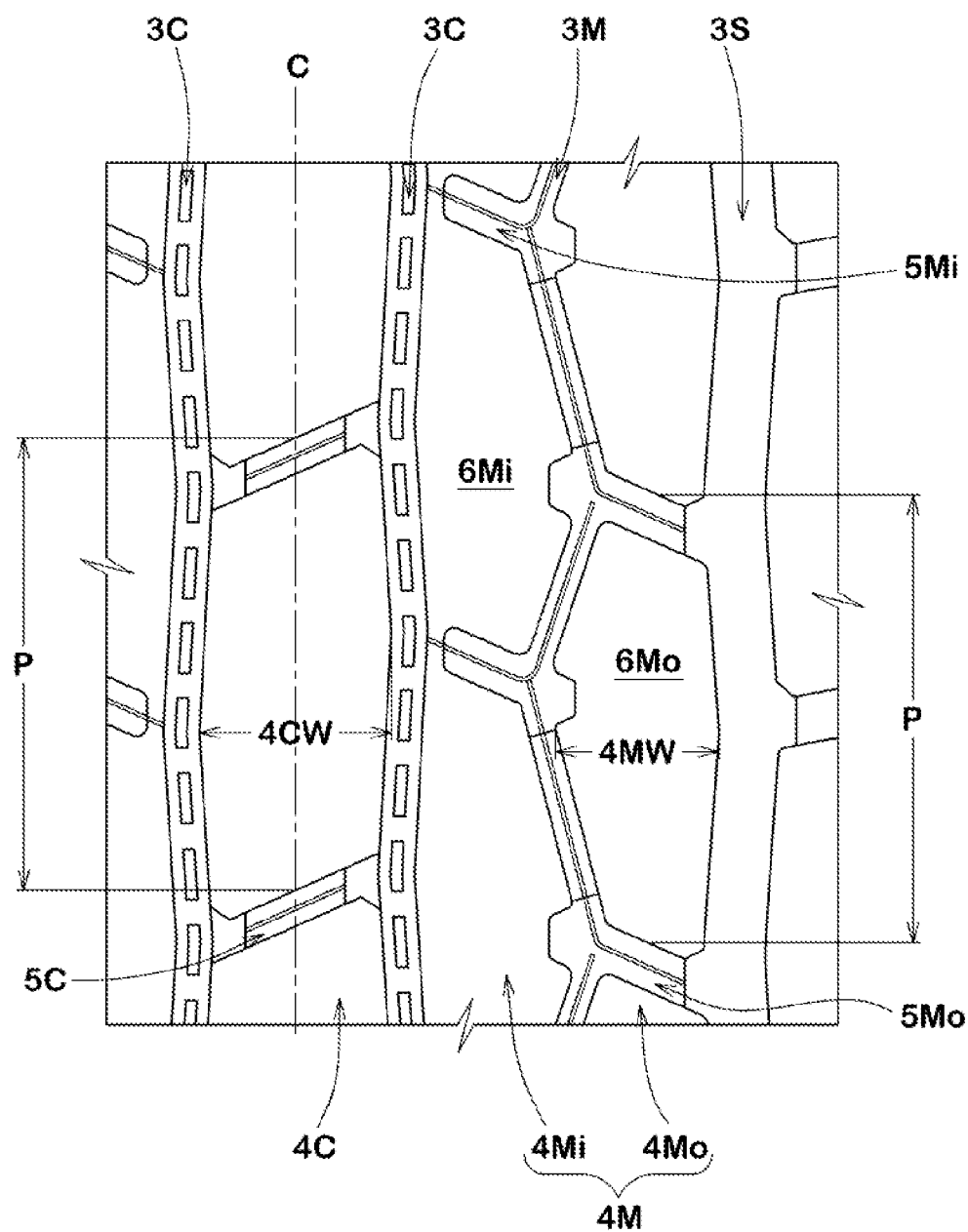
FIG. 18 is a partial enlarged view showing around a middle land portion of FIG. 15.

FIG. 18 illustrates a partial enlarged view of the middle land portion of FIG. 15. As shown in FIG. 18, the crown land portion 4C preferably has an axial maximum width 4CW in a range of from 5% to 15% of the tread width TW in order to further improve the rolling resistance while maintaining the wet performance of the tire. In the same point of view, the outer middle land portion 4Mo preferably has an axial width 4MW in a range of from 5% to 15% of the tread width TW.

While the particularly preferable embodiments of the present invention have been described in detail, the present invention in not limited to the illustrated embodiments, but can be modified and carried out in various aspects.

Comparison Test

First Embodiment

Heavy duty pneumatic tires of 275/80R22.5 having a tread pattern shown in FIG. 1 and Table 1 were manufactured and tested. In each test tire, the groove depth of the crown main groove was set to 20.0 mm. The test methods are as follows.

Rolling Resistance Test:

The test tire was made to run on a drum tester to measure its rolling resistance based on the following condition. The test results were evaluated using the reciprocal number of value of the rolling resistance. In Table 1, the reciprocal numbers were shown using an index based on Ex. 1 being 100. The larger the index, the better the rolling resistance is.
Rim size: 22.5×7.50
Inner pressure: 900 kPa
Tire load 33.83 kN
Traveling speed: 80 km/h Chipping Resistance Test:

The test tire was installed to one of rear wheels of a truck and the tire of Ex. 1 was installed to the other rear wheels. Then, the truck was made to run until the groove depth of the crown main groove of either tire was worn at 1.6 mm depth. Then, an observer checked the tire with the unaided eye whether there is any chipping.

Wet Performance Test:

The test tires with 80% worn were installed in a truck as its whole wheels. Then, a test driver suddenly started the truck using the second gear position by engaging its clutch at the timing of a 1,500 rpm engine speed on a wet asphalt road with a puddle 5 mm deep, and measured the time for traveling to 10 m distance. The test results were evaluated as the reciprocal of the time and were indicated using an index based on Ex. 1 being 100 in Table 1. The larger the index, the better the wet performance is.

Test results are shown in Table 1. From the test results, it was confirmed that Example tires in accordance with the present invention can be effectively improved the rolling resistance and chipping resistance while maintaining the wet performance.

TABLE 1

|  | Ref. 1 | Ref. 2 | Ex. 1 | Ex. 2 | Ex. 3 | Ex. 4 | Ex. 5 | Ex. 6 | Ref. 3 | Ex. 7 |
|---|---|---|---|---|---|---|---|---|---|---|
| Number of Pitches | 38 | 52 | 45 | 40 | 42 | 48 | 50 | 45 | 45 | 45 |
| Block element length/Pitch length (%) | 95 | 95 | 95 | 95 | 95 | 95 | 95 | 85 | 95 | 95 |
| Crown main groove zigzag amplitude/Middle main groove zigzag amplitude | 0.5 | 0.5 | 0.5 | 0.5 | 0.5 | 0.5 | 0.5 | 0.5 | 1.1 | 0.8 |
| Rolling resistance (Index) | 100 | 95 | 100 | 100 | 100 | 100 | 98 | 98 | 100 | 100 |
| Chipping resistance (Index) | 100 | 100 | 100 | 100 | 100 | 100 | 100 | 100 | 98 | 100 |
| Wet performance (Index) | 95 | 100 | 100 | 98 | 100 | 100 | 100 | 100 | 95 | 98 |

Second Embodiment

Heavy duty pneumatic tires of 275/80R22.5 having a tread pattern shown in FIG. 8 and Table 2 were manufactured and tested. In each test tire, the groove depth of the crown main groove was set to 16.0 mm. The test methods are as follows.

Uneven Wear Resistance Test:

The test tire was installed to one of driving wheels of a truck using a rim of 22.5×7.50 with an inner pressure of 900 kPa, and then the truck was made to run 20,000 km on a test course. After running, the amount of heel and toe wear of each test tire was measured. The test results were indicated as the reciprocal of the value of the amount of wear using an index based on Ex. 2 being 100 in Table 2. The larger the index, the better the uneven wear resistance is.

Wet Performance Test:

The wet performance of test tires was conducted in the same manner as the first embodiment.

Test results are shown in Table 2. From the test results, it was confirmed that Example tires in accordance with the present invention can be effectively improved the uneven wear resistance while maintaining the wet performance.

TABLE 2

|  | Ref. | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Depth D1/Depth CD1 (%) | 100 | 25 | 10 | 15 | 40 | 50 | 25 | 25 | 25 |
| Depth D2/Depth CD1 (%) | 100 | 45 | 45 | 45 | 45 | 45 | 30 | 60 | 45 |
| Depth D3/Depth CD1 (%) | 90 | 70 | 70 | 70 | 70 | 70 | 70 | 70 | 55 |
| Uneven wear resistance (Index) | 80 | 100 | 103 | 102 | 95 | 90 | 102 | 95 | 102 |
| Wet performance (Index) | 105 | 100 | 90 | 95 | 102 | 103 | 95 | 102 | 95 |

Third Embodiment

Heavy duty pneumatic tires of 275/80R22.5 having a tread pattern shown in FIG. 15 and Table 3 were manufactured and tested. The test methods are as follows.

Rolling Resistance Test:

The rolling resistance of test tires was conducted in the same manner as the first embodiment except for the following conditions.
Tire load: 4.2 kN
Traveling speed: 60 km/h Shoulder Wear Resistance Test:

The test tire was installed to one of front wheels of a truck, and then the truck was made to run 30,000 km on a dry pavement. After running, the amount of shoulder land portion of the test tire was measured. The test results were indicated as the reciprocal of the value of the amount of shoulder land portion using an index based on Ex. 1 being 100 in Table 3. The larger the index, the better the shoulder wear resistance is.

Punch Wear Resistance Test:

After the shoulder wear resistance test, the degree of the shoulder wear of the test tire tread was scored by an observer using an index based on Ex. 1 being 100 in Table 3. The larger the index, the better the shoulder wear resistance is.

Wet Performance Test:

The test was conducted in the same manner as the first embodiment. The test results were evaluated as the reciprocal of the time and were indicated using an index based on Ex. 1 being 100 in Table 3. The larger the index, the better the wet performance is.

Test results are shown in Table 3. From the test results, it was confirmed that Example tires in accordance with the present invention can be effectively improved the rolling resistance and wear resistance.

TABLE 3

|  | Ref. 1 | Ex. 1 | Ex. 2 | Ex. 3 | Ex. 4 | Ex. 5 | Ref. 2 | Ref. 3 | Ex. 6 | Ex. 7 |
|---|---|---|---|---|---|---|---|---|---|---|
| Contact pressure ratio P1/P2 | 1.15 | 1.08 | 1.13 | 1.1 | 1.05 | 1.02 | 1 | 1.08 | 1.08 | 1.08 |
| Contact pressure ratio P2/P3 | 1.3 | 1.4 | 1.35 | 1.38 | 1.42 | 1.45 | 1.5 | 1.4 | 1.4 | 1.4 |
| Thickness t(mm) | 6 | 12 | 8 | 10 | 14 | 16 | 18 | 12 | 12 | 12 |
| Number of Pitches | 45 | 45 | 45 | 45 | 45 | 45 | 45 | 38 | 40 | 42 |
| Block element length/Pitch length (%) | 95 | 95 | 95 | 95 | 95 | 95 | 95 | 95 | 95 | 95 |
| Land portion axial width W/Tread width TW (%) | 12 | 12 | 12 | 12 | 12 | 12 | 12 | 12 | 12 | 12 |
| Rolling resistance (Index) | 95 | 100 | 98 | 100 | 100 | 100 | 100 | 100 | 100 | 100 |
| Shoulder wear resistance (Index) | 100 | 100 | 100 | 100 | 100 | 98 | 95 | 100 | 100 | 100 |
| Punch wear resistance (Index) | 95 | 100 | 98 | 100 | 100 | 98 | 95 | 100 | 100 | 100 |
| Wet performance (Index) | 100 | 100 | 100 | 100 | 100 | 100 | 100 | 95 | 98 | 100 |

|  | Ex. 9 | Ref. 4 | Ref. 5 | Ex. 10 | Ex. 11 | Ex. 12 | Ref. 6 | Ex. 13 | Ex. 14 | Ex. 15 |
|---|---|---|---|---|---|---|---|---|---|---|
| Contact pressure ratio P1/P2 | 1.08 | 1.08 | 1.08 | 1.08 | 1.08 | 1.08 | 1.08 | 1.08 | 1.08 | 1.08 |
| Contact pressure ratio P2/P3 | 1.4 | 1.4 | 1.4 | 1.4 | 1.4 | 1.4 | 1.4 | 1.4 | 1.4 | 1.4 |
| Thickness t(mm) | 12 | 12 | 12 | 12 | 12 | 12 | 12 | 12 | 12 | 12 |
| Number of Pitches | 50 | 52 | 45 | 45 | 45 | 45 | 45 | 45 | 45 | 45 |
| Block element length/Pitch length (%) | 95 | 95 | 80 | 85 | 90 | 98 | 95 | 95 | 95 | 95 |
| Land portion axial width W/Tread width TW (%) | 12 | 12 | 12 | 12 | 12 | 12 | 3 | 5 | 10 | 15 |
| Rolling resistance (Index) | 98 | 95 | 95 | 98 | 100 | 100 | 95 | 98 | 100 | 100 |
| Shoulder wear resistance (Index) | 100 | 100 | 100 | 100 | 100 | 100 | 100 | 100 | 100 | 100 |
| Punch wear resistance (Index) | 100 | 100 | 100 | 100 | 100 | 100 | 100 | 100 | 100 | 100 |
| Wet performance (Index) | 100 | 100 | 100 | 100 | 100 | 100 | 100 | 100 | 100 | 100 |

The invention claimed is:

1. A heavy duty pneumatic tire comprising:
a tread portion provided with a plurality of circumferentially and continuously extending zigzag shaped main grooves, a plurality of land portions separated by the main grooves, and a plurality of lateral grooves to form a plurality of block elements on each land portions,
each land portion comprising a number of pitches in a range of from 40 to 50, wherein each pitch consists of one block element and one lateral groove adjacent to the concerned block element,
each block element having a circumferential length in a range of from 85% to 95% of a circumferential length of the pitch, and
the main grooves comprising at least one crown main groove arranged nearby a tire equator, at least one shoulder main groove arranged nearby a tread edge, and at least one middle main groove arranged between the crown main groove and the shoulder main groove,
wherein the middle main groove has a zigzag amplitude larger than those of the crown main groove and the shoulder main groove,
the middle main groove comprises axially innermost protruding portions and axially outermost protruding portions,
the lateral grooves comprise a plurality of axially inner middle lateral grooves extending axially inwardly from the axially innermost protruding portions of the middle main groove and a plurality of axially outer middle lateral grooves extending axially outwardly from the axially outermost protruding portions of the middle main groove,
the tread portion is further provided with a plurality of first groove bottom sipes and a plurality of second groove bottom sipes, and
each of the first groove bottom sipes extends from a bottom of the middle main groove to a bottom of one of the axially inner middle lateral grooves and each of the second groove bottom sipes extends from the bottom of the middle main groove to a bottom of one of the axially outer middle lateral grooves, and
wherein the first groove bottom sipes and the second groove bottom sipes are alternately arranged in a circumferential direction of the tire without communicating with each other at the axially innermost protruding portions of the middle main groove.

2. The tire according to claim 1,
wherein each of the first groove bottom sipes extends on a position where the middle main groove and one of the axially inner middle lateral grooves are connected at an acute angle, and
each of the second groove bottom sipes extends on a position where the middle main groove and one of the axially outer middle lateral grooves are connected at an obtuse angle.

3. The tire according to claim 1,
wherein the tread portion is provided with a pair of the crown main grooves each comprising axially innermost protruding portions and axially outermost protruding portions,
the lateral grooves comprise a plurality of crown lateral grooves each connecting between the axially innermost protruding portions of the crown main grooves, and
each crown lateral groove inclines in an opposite direction to the axially inner middle lateral groove.

4. The tire according to claim 1,
wherein each lateral groove of one of the land portions is arranged to be shifted by a substantially half length of the pitch to each lateral groove of the other one of the land portions adjacent to the concerned land portion.

5. The tire according to claim 1,
wherein the middle main groove and each lateral groove have groove depths smaller than those of the crown main groove and the shoulder main groove.

6. A heavy duty pneumatic tire comprising:
a tread portion provided with a plurality of circumferentially and continuously extending zigzag shaped main grooves, the main grooves comprising at least one crown main groove arranged nearby a tire equator, at least one shoulder main groove arranged nearby a tread edge, and at least one middle main groove arranged between the crown main groove and the shoulder main groove,
a plurality of land portions separated by the main grooves, and
a plurality of lateral grooves to form a plurality of block elements on each land portions,
wherein the land portions comprise an axially inner middle land portion arranged between the crown main groove and the middle main groove, and an axially outer middle land portion arranged between the middle main groove and the shoulder main groove,
the axially inner middle land portion is provided with a plurality of axially inner lateral grooves to form a plurality of axially inner block elements,
the axially outer middle land portion is provided with a plurality of axially outer lateral grooves to form a plurality of axially outer block elements,
the tread portion is further provided with a first connecting portion and a second connecting portion,
when the tread portion is worn as a first state, the first connecting portion comes into contact with the road to connect the axially inner block element with the axially outer block element so that a plurality of connected blocks are formed, and
when the tread portion is worn as a second state that comes from later than the first state, the second connecting portion comes into contact with the road to connect the connected blocks so that a rib is formed.

7. The tire according to claim 6,
wherein the middle main groove comprises a first inclined element and a second inclined element having a circumferential length smaller than that of the first inclined element, and the first connecting portion is provided in the first inclined element.

8. The tire according to claim 7,
wherein the first connecting portion is provided with a sipe extending along the first inclined element.

9. The tire according to claim 6,
wherein the second connecting portion has a depth larger than that of the first connecting portion.

10. The tire according to claim 6,
wherein the first connecting portion has a depth in a range of from 15% to 40% of a maximum groove depth of the main grooves.

11. The tire according to claim 6,
wherein the middle main groove comprises a plurality of axially innermost protruding portions and a plurality of axially outermost protruding portions,
each axially inner middle lateral groove extends from each axially innermost protruding portion of the middle main groove toward axially inward, and
each axially outer middle lateral groove extends from each axially outermost protruding portion of the middle main groove toward axially outward.

12. A heavy duty pneumatic tire comprising:
a tread portion provided with a plurality of circumferentially and continuously extending zigzag shaped main grooves, the main grooves comprising a pair of crown main grooves arranged on both sides of a tire equator, at least one shoulder main groove arranged nearby a tread edge, and at least one middle main groove arranged between one of the crown main grooves and the shoulder main groove,
a plurality of land portions separated by the main grooves, and
a plurality of lateral grooves to form a plurality of block elements on each land portions,
wherein the land portions comprise a crown land portion arranged between the crown main grooves, a middle land portion arranged between the crown main groove and the shoulder main groove, and a shoulder land portion arranged between the shoulder main groove and the tread edge,
wherein in a standard loaded condition where the tire is mounted on a standard rim with a standard pressure and is loaded with a standard load, a contact pressure P1 of the crown land portion is in a range of from 102% to 113% of a contact pressure P2 of the middle land portion, and the contact pressure P2 of the middle portion is in a range of from 135% to 145% of a contact pressure P3 of the shoulder land portion.

13. The tire according to claim 12,
wherein the tire comprises a toroidal carcass, and a belt layer disposed radially outward the carcass in the tread portion, and
a thickness from an outer surface of the belt layer to a tire inner surface at an axial position of the shoulder main groove is in a range of from 8 to 16 mm in a standard unloaded condition where the tire is mounted on the standard rim with the standard pressure and no tire load is loaded.

14. The tire according to claim 12,
wherein the tread portion has a land ratio in a range of from 70% to 85%.

15. The tire according to claim 12,
wherein the lateral grooves comprise a plurality of crown lateral grooves extending on the crown land portion, a plurality of middle lateral grooves extending on the middle land portion, and a plurality of shoulder lateral grooves extending on the shoulder land portion, and
a land ratio of the crown land portion is not less than a land ratio of the shoulder land portion, and a land ratio of the middle portion is less than a land ratio of the shoulder land portion.

16. The tire according to claim 12,
wherein each of the crown land portion and the middle land portion has an axially maximum width in a range of from 5% to 15% of a tread width.

* * * * *